US012798013B2

(12) United States Patent
Riechel et al.

(10) Patent No.: US 12,798,013 B2
(45) Date of Patent: Nov. 17, 2026

(54) LASER-PROCESSING APPARATUS, METHODS OF OPERATING THE SAME, AND METHODS OF PROCESSING WORKPIECES USING THE SAME

(71) Applicant: ELECTRO SCIENTIFIC INDUSTRIES, INC., Beaverton, OR (US)

(72) Inventors: Patrick Riechel, Beaverton, OR (US); Mark Unrath, Beaverton, OR (US); Jake Roberts, Beaverton, OR (US); Joseph Hasty, Beaverton, OR (US)

(73) Assignee: Electro Scientific Industries, Inc., Beaverton, OR (US)

( * ) Notice: Subject to any disclaimer, the term of this patent is extended or adjusted under 35 U.S.C. 154(b) by 107 days.

(21) Appl. No.: 18/663,649

(22) Filed: May 14, 2024

(65) Prior Publication Data

US 2024/0293897 A1 Sep. 5, 2024

Related U.S. Application Data

(62) Division of application No. 17/047,254, filed as application No. PCT/US2019/035443 on Jun. 4, 2019, now Pat. No. 12,011,785.

(Continued)

(51) Int. Cl.
*B23K 26/70* (2014.01)
*B23K 26/03* (2006.01)

(Continued)

(52) U.S. Cl.
CPC .......... *B23K 26/705* (2015.10); *B23K 26/032* (2013.01); *B23K 26/067* (2013.01);

(Continued)

(58) Field of Classification Search
CPC ....... G02F 1/33; G02B 27/108; B65H 18/103; B23K 26/083; B23K 26/067; B23K 26/032; B23K 26/082; B23K 26/705

(Continued)

(56) References Cited

U.S. PATENT DOCUMENTS 3,319,071 A * 5/1967 Werth .................... G01N 21/05 250/343
3,994,603 A * 11/1976 Paschedag ............. G01N 21/85 340/630

(Continued)

FOREIGN PATENT DOCUMENTS

CN 103033138 A 4/2013
CN 205772277 U 12/2016

(Continued)

OTHER PUBLICATIONS

Office Action report for TW counterpart application No. 113101706 dated Aug. 12, 2024. (38 pages).

(Continued)

*Primary Examiner* — Jimmy Chou
(74) *Attorney, Agent, or Firm* — Laurin T. Buettner

(57) ABSTRACT

Apparatus and techniques for laser-processing workpieces can be improved, and new functionalities can be provided. Some embodiments discussed relate to use of beam characterization tools to facilitate adaptive processing, process control and other desirable features. Other embodiments relate to laser power sensors incorporating integrating spheres. Still other embodiments relate to workpiece handling systems capable of simultaneously providing different workpieces to a common laser-processing apparatus. A great number of other embodiments and arrangements are also detailed.

17 Claims, 9 Drawing Sheets

Related U.S. Application Data

(60) Provisional application No. 62/688,484, filed on Jun. 22, 2018, provisional application No. 62/680,856, filed on Jun. 5, 2018.

(51) Int. Cl.

| | |
|---|---|
| ***B23K 26/067*** | (2006.01) |
| ***B23K 26/08*** | (2014.01) |
| ***B23K 26/082*** | (2014.01) |
| ***B65H 18/10*** | (2006.01) |
| ***G02B 27/10*** | (2006.01) |
| ***G02F 1/33*** | (2006.01) |

(52) U.S. Cl.
CPC .......... *B23K 26/082* (2015.10); *B23K 26/083* (2013.01); *B65H 18/103* (2013.01); *G02B 27/108* (2013.01); *G02F 1/33* (2013.01)

(58) Field of Classification Search
USPC ..................................................... 219/121.62
See application file for complete search history.

(56) References Cited

U.S. PATENT DOCUMENTS 4,797,696 A 1/1989 Allen et al.
4,912,487 A 3/1990 Porter et al.
4,942,305 A * 7/1990 Sommer ............ G01N 15/1427 356/339
5,128,693 A * 7/1992 Tatemichi ............ G11B 7/0065
5,168,454 A 12/1992 LaPlante et al.
5,220,179 A * 6/1993 Gagea ...................... G01V 8/10 250/214 RC
5,340,975 A * 8/1994 Vogelgesang ...... H04N 1/40031 219/121.62
5,463,202 A * 10/1995 Kurosawa ............. B23K 26/04 372/29.014
5,545,896 A 8/1996 Bratt et al.
5,633,747 A 5/1997 Nikoonahad
5,638,267 A 6/1997 Singhose et al.
5,751,585 A 5/1998 Cutler et al.
5,798,927 A 8/1998 Cutler et al.
5,847,960 A 12/1998 Cutler et al.
5,917,300 A 6/1999 Tanquary et al.
6,133,982 A * 10/2000 Inoue .................. G03F 7/70691 355/53
6,225,910 B1 * 5/2001 Kadwell ............. G08B 29/043 340/630
6,314,463 B1 11/2001 Abbott et al.
6,430,465 B2 8/2002 Cutler
6,469,623 B2 * 10/2002 Pattok .................. G08B 29/145 340/3.3
6,535,278 B1 * 3/2003 Imura ...................... G01J 3/44 356/73
6,600,600 B2 7/2003 Chen
6,603,555 B1 * 8/2003 Nanami ................ G01N 21/39 356/437
6,606,998 B1 8/2003 Gold
6,606,999 B2 8/2003 Crooks et al.
6,816,294 B2 11/2004 Unrath et al.
6,947,454 B2 9/2005 Sun et al.
7,019,891 B2 3/2006 Johnson
7,027,199 B2 4/2006 Johnson
7,133,182 B2 11/2006 Johnson et al.
7,133,186 B2 11/2006 Johnson
7,133,187 B2 11/2006 Johnson
7,133,188 B2 11/2006 Johnson
7,244,906 B2 7/2007 Jordens et al.
7,245,412 B2 7/2007 Bruland et al.
7,259,354 B2 8/2007 Pailthorp et al.
7,292,616 B2 * 11/2007 Grek ....................... H01S 3/134 219/121.61
7,483,139 B2 * 1/2009 Powell ................ G08B 17/103 356/438
7,483,196 B2 * 1/2009 Allen .................... G01J 1/4257 359/305
7,605,343 B2 10/2009 Lei et al.
7,611,745 B2 11/2009 Nishikawa et al.
7,659,986 B2 * 2/2010 Sugimoto .............. G01N 21/53 340/630
7,834,293 B2 11/2010 Wile et al.
8,026,158 B2 9/2011 Bruland et al.
8,076,605 B2 12/2011 Bruland et al.
8,094,036 B2 * 1/2012 Heberer ............... B23K 26/702 219/121.81
8,288,679 B2 * 10/2012 Unrath .............. B23K 26/0648 219/121.67
8,404,998 B2 3/2013 Unrath et al.
8,448,468 B2 5/2013 Pastel et al.
8,497,450 B2 7/2013 Bruland et al.
8,642,918 B2 * 2/2014 Unrath ................ B23K 26/705 359/239
8,648,277 B2 2/2014 Alpay et al.
8,680,430 B2 3/2014 Unrath
8,847,113 B2 * 9/2014 Unrath ................ B23K 26/364 219/121.81
8,896,909 B2 11/2014 Sandstrom et al.
8,928,853 B2 1/2015 Lin et al.
9,259,802 B2 2/2016 Willey et al.
9,506,862 B2 * 11/2016 Kobayashi ........... B23K 26/032
10,113,954 B2 * 10/2018 Hayashi ............. G01N 21/3504
10,374,384 B2 * 8/2019 Jebali .................... H01S 3/0071
10,386,310 B2 * 8/2019 Blaine ..................... G01J 3/433
11,077,526 B2 * 8/2021 Kleinert ............... B23K 26/382
11,491,583 B2 * 11/2022 Bocksrocker .......... B23K 15/08
2002/0176151 A1 * 11/2002 Moon ................. G02B 27/126 359/298
2004/0178296 A1 9/2004 Wild et al.
2005/0035103 A1 * 2/2005 Partlo ............... B23K 26/0622 219/121.73
2005/0061981 A1 * 3/2005 Allen .................... G01J 1/4257 250/353
2005/0150878 A1 * 7/2005 Thomas ................ B23K 26/40 219/121.68
2006/0066710 A1 3/2006 Fukui
2006/0196858 A1 * 9/2006 Barron ...................... B44F 1/06 219/121.69
2006/0237129 A1 * 10/2006 Chen ................... B29C 66/9161 219/121.76
2007/0000885 A1 * 1/2007 Thomas ................ B08B 7/0042 219/121.68
2007/0045253 A1 * 3/2007 Jordens .................. B23K 26/03 219/121.71
2007/0075063 A1 4/2007 Wilbanks et al.
2008/0023452 A1 * 1/2008 Grek ....................... H01S 3/134 219/121.61
2008/0180788 A1 * 7/2008 Kakui ................ B23K 26/0676 359/345
2009/0007933 A1 * 1/2009 Thomas ................ B23K 26/36 219/121.81
2010/0089882 A1 * 4/2010 Tamura ................ B23K 26/146 219/121.69
2011/0298156 A1 * 12/2011 Hooper ............. B23K 26/0622 264/400
2012/0057337 A1 * 3/2012 Liebald ................. C03C 14/006 252/301.4 R
2012/0074105 A1 * 3/2012 Okamoto ............. B23K 26/146 219/121.72
2013/0196455 A1 * 8/2013 Shen ................. B23K 26/0608 257/E21.333
2014/0026351 A1 1/2014 Willey et al.
2014/0083983 A1 3/2014 Zhang et al.
2014/0196140 A1 7/2014 Gong
2014/0202997 A1 * 7/2014 Vadali ................. B23K 26/354 219/121.11
2014/0263201 A1 * 9/2014 Unrath ................ B23K 26/082 219/121.8
2014/0263212 A1 9/2014 Zhang
2014/0263223 A1 * 9/2014 Unrath ................ B23K 26/386 219/121.81

(56) References Cited

U.S. PATENT DOCUMENTS

| | | | | |
|---|---|---|---|---|
| 2014/0312013 | A1* | 10/2014 | Frankel | B23K 26/0853 219/121.68 |
| 2015/0190884 | A1* | 7/2015 | Roy | B23K 26/127 250/288 |
| 2016/0011311 | A1* | 1/2016 | Mushimoto | G06K 7/10831 250/236 |
| 2016/0199935 | A1* | 7/2016 | Chen | B23K 26/0624 219/121.61 |
| 2016/0313417 | A1* | 10/2016 | Kawabata | G02F 1/33 |
| 2018/0029164 | A1* | 2/2018 | Kramer | B23K 26/705 |
| 2018/0354068 | A1* | 12/2018 | Duan | B23K 26/0648 |
| 2021/0138578 | A1* | 5/2021 | Beckett | B22F 12/90 |
| 2023/0185238 | A1* | 6/2023 | Kurita | B23K 26/384 359/9 |

FOREIGN PATENT DOCUMENTS

| | | | |
|---|---|---|---|
| CN | 107438494 | A | 12/2017 |
| DE | 102013201968 | B4 | 8/2014 |
| EP | 2359978 | A2 | 8/2011 |
| JP | 1997253878 | A | 9/1997 |
| JP | 2016044065 | A | 8/2016 |
| JP | 2018099698 | A | 6/2018 |
| KR | 1020160000448 | A | 1/2016 |
| KR | 1020170096812 | A | 8/2017 |
| TW | 201208219 | A | 2/2012 |
| TW | 201215877 | A | 4/2012 |
| TW | 201424902 | A | 7/2014 |
| TW | 201536658 | A | 10/2015 |
| TW | 201545829 | A | 12/2015 |
| TW | 201635660 | A | 10/2016 |
| TW | 201733728 | A | 10/2017 |
| WO | 2009087392 | A1 | 7/2009 |
| WO | 2012002192 | A1 | 1/2012 |
| WO | 2017044646 | A1 | 3/2017 |
| WO | 2017137022 | A1 | 8/2017 |
| WO | 2018022441 | A1 | 2/2018 |

OTHER PUBLICATIONS

Office Action report issued in JP counterpart application No. 2024-018330 dated Apr. 22, 2025. (6 pages).

Office Action report issued in TW counterpart application No. 113101706. dated Jun. 19, 2025. (9 pages).

The PCT/US2019/035443, international search report issued Sep. 27, 2019, 3 pages.

The PCT/US2019/035443, written opinion, 8 pages.

The European Search Report issued Dec. 17, 2021 to European Patent Application No. 19815145.8, 9 pages.

Office Action report for Chinese counterpart application No. 201980030416.9 mailed Jun. 28, 2022 (9 pages).

The Office Action for Taiwanese counterpart application No. 108119537dated Nov. 9, 2022 (9 pages).

The Office Action issued for Taiwanese counterpart application No. 108119537 mailed Apr. 26, 2023 (11 pages).

The Office Action issued for JP counterpart application No. 2020-567821 dated Jul. 4, 2023 (2 pages).

Office Action issued in CN counterpart application No. 202310211386.X dated Apr. 22, 2026.

* cited by examiner

LASER-PROCESSING APPARATUS, METHODS OF OPERATING THE SAME, AND METHODS OF PROCESSING WORKPIECES USING THE SAME

CROSS-REFERENCE TO RELATED APPLICATIONS

This is a divisional application of application Ser. No. 17/047,254, filed Oct. 13, 2020, which was the National Stage of International Application No. PCT/US2019/035443, which claims the benefit of U.S. Provisional Application No. 62/680,856, filed Jun. 5, 2018, and U.S. Provisional Application No. 62/688,484, filed Jun. 22, 2018, each of which is incorporated by reference in its entirety.

BACKGROUND

I. Technical Field

Embodiments discussed herein relate generally to apparatuses for laser-processing workpieces and, more particularly, to a laser-processing apparatus incorporating a beam characterization tool, methods of operating the same and methods of laser-processing workpieces using the same.

II. Background

When laser-processing a workpiece, knowing the in-focus size and shape of an incident beam of laser energy at the workpiece is critical for calculating fluence (i.e., energy per unit area) and defining a robust process. As used herein, a process is "robust" if it can meet desired quality specifications across design tolerances in characteristics of the laser-processing apparatus, as well as across slight changes to apparatus and workpiece characteristics due to environmental changes, handling and contamination over time.

In-focus laser spot size and shape are generally well-defined directly after optics within the laser-processing apparatus are initially installed and properly aligned. However, when an out-of-focus laser spot is used during processing and/or after the laser and laser-processing apparatus have been subjected to the vagaries of time, temperature fluctuations, mechanical vibrations and stresses, and optical contamination, the laser spot size and shape at the workpiece can vary. For example, when an out-of-focus laser spot is used, there will have more variation in effective spot size than when an in-focus laser spot is used due to the natural astigmatisms within the laser that mainly present themselves in the beam "waist." Furthermore, over the lifetime of lasers, the laser spot output can degrade, resulting in undesirable changes in spot size and shape at the workpiece. Next, as laser systems with optical beam delivery systems are subjected to temperature fluctuations and mechanical vibrations and stresses, the optics and optical mounts of the laser-processing apparatus and within the laser itself can shift minutely, resulting in variations in spot size at the workpiece. Finally, as optics are contaminated by debris, dust, oil, and other environmental contaminants, the beam can be distorted along the beam path within the apparatus, resulting in fluctuations of the spot size and spot shape at the workpiece.

Conventional techniques for monitoring laser spot size and shape and for reducing or compensating for variations thereof involve one or more of the following: monitoring and controlling laser power to adjust the fluence (energy/unit area) of laser pulses delivered to the workpiece to compensate for changes in spot size; using lasers known to have stable pulse energy to ensure pulse energy consistency; using stable lasers known to have low variability in beam size/shape); using robust optics designs to reduce some variability in spot size/shape; using robust mechanical designs to avoid environmentally-induced beam quality changes that are caused by optics shifting; using robust optics alignment practices during set-up or installation of laser-processing apparatuses to ensure that spot sizes are satisfactorily consistent from one laser-processing apparatus to the next; developing laser-processing recipes that are more robust and able to deliver acceptable quality despite a range of spot characteristics, power variations, and beam positioning variations (there is generally a limit to how robust one can make a process recipe), and there is generally an inverse relationship between process robustness and process productivity: as process becomes more robust, the speed/productivity of the process is typically diminished).

A system or apparatus for laser-processing relatively-thin, flexible workpieces (also known as a "webs") can sometimes be provided with, or be used in conjunction with, a handling system adapted to guide the web to the laser-processing apparatus (e.g., so the web can be subjected to laser-processing) and to remove the laser-processed web from the apparatus. However, conventional handling systems are known to only be able to handle one type of web material at a time. Further, a conventional laser-processing apparatus will typically secure the web to a chuck or other fixture prior to laser-processing, and then move the fixture (thus, moving the web) during laser-processing. Accordingly, some conventional handling systems are known to incorporate dancer roller assemblies are operative to take up (or give out) slack in the web when the fixture moves. However, there can be a delay between the movement of the fixture and the movement of the rollers in the dancer assemblies, which can result in undesirable tension or strain in the web, potentially damaging the web.

SUMMARY

Figure 1:
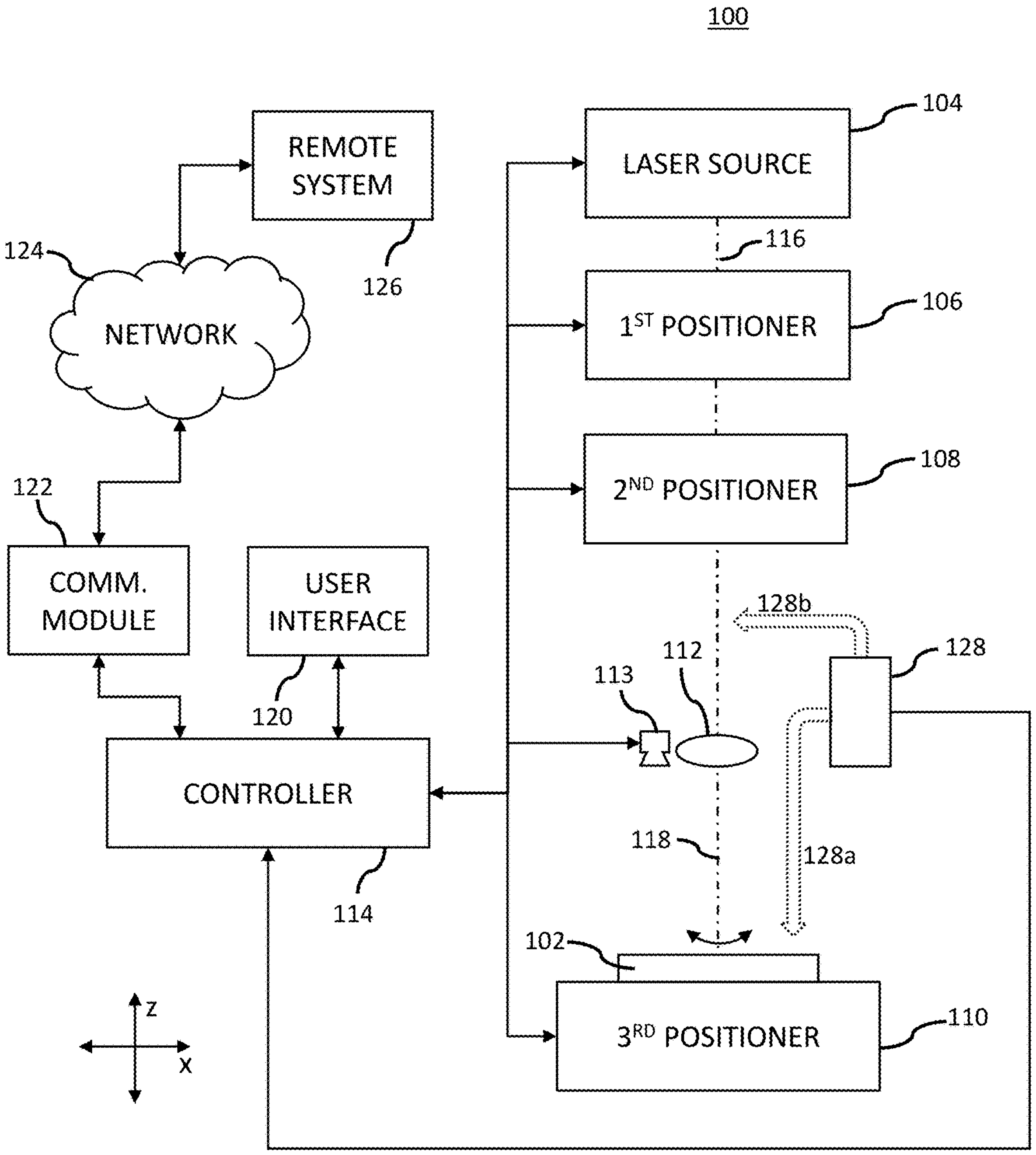
FIG. 1 schematically illustrates a laser-processing apparatus according to one embodiment.

In one embodiment, a laser-processing apparatus can be broadly described as including a laser source operative to generate a beam of laser energy, wherein the beam of laser energy is propagatable along a beam path and at least one component operative to perform at least one act on the beam of laser energy selected from the group consisting of: (a) deflecting the beam of laser energy, (b) adjusting the position of a beam waist of the beam of laser energy along the beam path, (c) adjusting a power of the beam of laser energy; and (d) adjusting a beam size of the beam of laser energy. The apparatus can also include a beam characterization tool operative to measure one or more characteristics of the beam of laser energy and generate measurement data representative of one or more of the measured beam characteristics and at least one processor. The at least one processor can be operative to process the measurement data to obtain one or more measured values associated with the one or more measured characteristics of the beam of laser energy; and output one or more control signals to the at least one component when the one or more measured values is outside a threshold processing tolerance, wherein the one or more control signals are configured to cause the at least one component to perform at least one act on the beam of laser energy such that the one or more measured characteristics of the beam of laser energy are brought to within the threshold processing tolerance.

In another embodiment, a controller can be used with a laser-processing apparatus including a laser source operative to generate a beam of laser energy, at least one component operative to perform at least one act on the beam of laser energy selected from the group consisting of: (a) deflecting the beam of laser energy, (b) adjusting the position of a beam waist of the beam of laser energy in a beam path along which the beam of laser energy is propagatable, (c) adjusting a power of the beam of laser energy; and (d) adjusting a beam size of the beam of laser energy, and a beam characterization tool operative to measure one or more characteristics of the beam of laser energy and generate measurement data representative of one or more of the measured beam characteristics. The controller can include at least one processor operative to process the measurement data to obtain one or more measured values associated with the one or more measured characteristics of the beam of laser energy and output one or more control signals to the at least one component when the one or more measured values is outside a threshold processing tolerance, wherein the one or more control signals are configured to cause the at least one component to perform at least one act on the beam of laser energy such that the one or more measured characteristics of the beam of laser energy are brought to within the threshold processing tolerance.

In another embodiment, non-transitory computer-readable media can be used with a laser-processing apparatus including a laser source operative to generate a beam of laser energy, at least one component operative to perform at least one act on the beam of laser energy selected from the group consisting of: (a) deflecting the beam of laser energy, (b) adjusting the position of a beam waist of the beam of laser energy in a beam path along which the beam of laser energy is propagatable, (c) adjusting a power of the beam of laser energy; and (d) adjusting a beam size of the beam of laser energy, a beam characterization tool operative to measure one or more characteristics of the beam of laser energy and generate measurement data representative of one or more of the measured beam characteristics, and a controller operative to control an operation of the at least one component. The non-transitory computer-readable media can have instructions stored thereon which, when executed by the controller, cause the controller to process the measurement data to obtain one or more measured values associated with the one or more measured characteristics of the beam of laser energy and output one or more control signals to the at least one component when the one or more measured values is outside a threshold processing tolerance, wherein the one or more control signals are configured to cause the at least one component to perform at least one act on the beam of laser energy such that the one or more measured characteristics of the beam of laser energy are brought to within the threshold processing tolerance.

DETAILED DESCRIPTION

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The section headings used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

I. Overview

Embodiments described herein relate generally to methods and apparatuses for laser-processing (or, more simply, "processing") a workpiece. Generally the processing is accomplished, either in whole or in part, by irradiating the workpiece with laser radiation, to heat, melt, evaporate, ablate, crack, discolor, polish, roughen, carbonize, foam, or otherwise modify one or more properties or characteristics of one or more materials from which the workpiece is formed (e.g., in terms of chemical composition, atomic structure, ionic structure, molecular structure, electronic structure, microstructure, nanostructure, density, viscosity, index of refraction, magnetic permeability, relative permittivity, texture, color, hardness, transmissivity to electromagnetic radiation, or the like or any combination thereof). Materials to be processed may be present at an exterior of the workpiece prior to or during processing, or may be located completely within the workpiece (i.e., not present at an exterior of the workpiece) prior to or during processing.

Specific examples of processes that may be carried out by the disclosed apparatus for laser-processing include via drilling or other hole formation, cutting, perforating, welding, scribing, engraving, marking (e.g., surface marking, sub-surface marking, etc.), laser-induced forward transfer, cleaning, bleaching, bright pixel repair (e.g., color filter darkening, modification of OLED material, etc.), decoating, surface texturing (e.g., roughening, smoothing, etc.), or the like or any combination thereof. Thus, one or more features on that may be formed on or within a workpiece, as a result of the processing, can include openings, slots, vias or other holes, grooves, trenches, scribe lines, kerfs, recessed regions, conductive traces, ohmic contacts, resist patterns, human- or machine-readable indicia (e.g., comprised of one or more regions in or on the workpiece having one or more visually or texturally distinguishing characteristics), or the like or any combination thereof. Features such as openings, slots, vias, holes, etc., can have any suitable or desirable shape (e.g., circular, elliptical, square, rectangular, triangular, annular, or the like or any combination thereof) when viewed from a top plan view. Further, features such as openings, slots, vias, holes, etc., can extend completely through the workpiece (e.g., so as to form so-called "through vias," "through holes," etc.) or only partially through the workpiece (e.g., so as to form so-called "blind vias," "blind holes," etc.).

Workpieces that may be processed can be generically characterized being formed of one or more metals, polymers, ceramics, composites, or any combination thereof (e.g., whether as an alloy, compound, mixture, solution, composite, etc.). Accordingly, materials that may be processed include one or more metals such as Al, Ag, Au, Cr, Cu, Fe, In, Mg, Mo, Ni, Pt, Sn, Ti, or the like, or any combination thereof (e.g., whether as an alloy, composite, etc.), conductive metal oxides (e.g., ITO, etc.), transparent conductive polymers, ceramics, waxes, resins, interlayer dielectric materials (e.g., silicon dioxide, silicon nitride, silicon oxynitride, etc., low-k dielectric materials such as methyl silsesquioxane (MSQ), hydrogen silsesquioxane (HSQ), fluorinated tetraethyl orthosilicate (FTEOS), or the like or any combination thereof), organic dielectric materials (e.g., SILK, benzocyclobutene, Nautilus, (all manufactured by Dow), polyfluorotetraethylene, (manufactured by DuPont), FLARE, (manufactured by Allied Chemical), etc., or the like or any combination thereof), semiconductor or optical device substrate materials (e.g., $Al_2O_3$, AlN, BcO, Cu, GaAS, GaN, Ge, InP, Si, $SiO_2$, SiC, $Si_{1-x}Ge_x$ (where $0.0001<x<0.9999$), or the like, or any combination or alloy thereof), glass (e.g., fused quartz, soda-lime-silica glass, sodium borosilicate glass, lead oxide glass, aluminosilicate glass, germanium oxide glass, aluminate glass, phosphate glass, borate glass, chalcogenide glass, amorphous metal, or the like or any combination thereof), sapphire, polymeric materials (e.g., polyamide, polyimide, polyester, polyethylene naphthalate (PEN), polyethylene terephthalate (PET), polyacetal, polycarbonate, modified polyphenylene ether, polybutylene terephthalate, polyphenylene sulfide, polyether sulfone, polyether imide, polyether ether ketone, liquid crystal polymer, acrylonitrile butadiene styrene, or any compound, composite or alloy thereof), leather, paper, build-up materials (e.g., AJINOMOTO Build-up Film, also known as "ABF", etc.), solder resist, or the like or any composite, laminate, or other combination thereof.

Specific examples of workpieces that may be processed include, panels of printed circuit boards (PCBs) (also referred to herein as "PCB panels"), PCBs, PCB laminates (e.g., FR4, High Tg Epoxy, BT, polyimide, or the like or any combination thereof), PCB laminate prepregs, substrate-like PCBs (SLPs), panels of flexible printed circuits (FPCs) (also referred to herein as "FPC panels"), FPCs, coverlay films, integrated circuits (ICs), IC substrates, IC packages (ICPs), light-emitting diodes (LEDs), LED packages, semiconductor wafers, electronic or optical device substrates, interposers, lead frames, lead frame blanks, display substrates (e.g., substrates having TFTs, color filters, organic LED (OLED) arrays, quantum dot LED arrays, or the like or any combination thereof, formed thereon), lenses, mirrors, turbine blades, powders, films, foils, plates, molds (e.g., wax molds, molds for injection-molding processes, investment-casting processes, etc.), fabrics (woven, felted, etc.), surgical instruments, medical implants, consumer packaged goods, shoes, bicycles, automobiles, automotive or aerospace parts (e.g., frames, body panels, etc.), appliances (e.g., microwaves, ovens, refrigerators, etc.), device housings (e.g., for watches, computers, smartphones, tablet computers, wearable electronic devices, or the like or any combination thereof).

II. System—Overview

FIG. 1 schematically illustrates a laser-processing apparatus in accordance with one embodiment of the present invention.

Referring to the embodiment shown in FIG. 1, a laser-processing apparatus 100 (also referred to herein simply as an “apparatus”) for processing a workpiece 102 can be characterized as including a laser source 104 for generating a beam of laser energy, one or more positioners (e.g., a first positioner 106, a second positioner 108, a third positioner 110, or any combination thereof) and a scan lens 112.

Laser energy transmitted along a beam path 116, through the scan lens 112, propagates along a beam axis 118 so as to be delivered to the workpiece 102. Laser energy propagating along the beam axis 118 may be characterized as having a Gaussian-type spatial intensity profile or a non-Gaussian-type (i.e., “shaped”) spatial intensity profile (e.g., a “top-hat” spatial intensity profile). Regardless of the type of spatial intensity profile, the spatial intensity profile can also be characterized as a shape (i.e., a cross-sectional shape, also referred to herein as a “spot shape”) of the beam of laser energy propagating along the beam axis 118 (or beam path 116), which may be circular, elliptical, square, rectangular, triangular, hexagonal, ring-shaped, etc., or arbitrarily shaped. As used herein, the term “spot size” refers to the diameter or maximum spatial width of the beam of laser energy delivered at a location (also referred to as a “process spot,” “spot location” or, more simply, a “spot”) where the beam axis 118 intersects a region of the workpiece 102 that is to be, at least partially, processed by the delivered beam of laser energy. For purposes of discussion herein, spot size is measured as a radial or transverse distance from the beam axis 118 to where the optical intensity drops to, at least, $1/e^2$ of the optical intensity at the beam axis 118. Generally, the spot size of the beam of laser energy will be at a minimum at the beam waist. Once delivered to the workpiece 102, laser energy within the beam can be characterized as impinging the workpiece 102 at a spot size in a range from 2 μm to 200 μm. It will be appreciated, however, that the spot size can be made smaller than 2 μm or larger than 200 μm. Thus, the beam of laser energy delivered to the workpiece 102 can have a spot size greater than, less than, or equal to 2 μm, 3 μm, 5 μm, 7 μm, 10 μm, 15 μm, 30 μm, 35 μm, 40 μm, 45 μm, 50 μm, 55 μm, 80 μm, 100 μm, 150 μm, 200 μm, etc., or between any of these values.

Generally, the aforementioned positioners (e.g., the first positioner 106, the second positioner 108 and the third positioner 110 are configured to change the relative position between the spot and the workpiece 102. In view of the description that follows, it should be recognized that inclusion of the first positioner 106 is optional (i.e., the apparatus 100 need not include the first positioner 106), provided that the apparatus 100 includes the second positioner 108, the third positioner 110, or a combination thereof. Likewise, it should be recognized that inclusion of the second positioner 108 is optional, provided that the apparatus 100 includes the first positioner 106, the third positioner 110, or a combination thereof. Lastly, it should similarly be recognized that inclusion of the third positioner 110 is optional, provided that the apparatus 100 includes the first positioner 106, the second positioner 108, or a combination thereof.

The apparatus 100 also includes one or more optical components (e.g., beam expanders, beam shapers, apertures, filters, collimators, lenses, mirrors, polarizers, wave plates, diffractive optical elements, refractive optical elements, or the like or any combination thereof) to focus, expand, collimate, shape, polarize, filter, split, combine, crop, or otherwise modify, condition, direct, etc., the beam of laser energy obtained from the laser source 104 along one or more beam paths (e.g., beam path 116) to the scan lens 112. Such optical components may be inserted into the beam path 116 at any suitable or desired location (e.g., between the laser source 104 and the first positioner 106, between the laser source 104 and the second positioner 108, between the first positioner 106 and the second positioner 108, between the second positioner 108 and the scan lens 112, or the like or any combination thereof).

One example of such an optical component is a variable optical attenuator (VOA), configured to selectively and variably reduce the power of the laser pulses propagating along the beam path 116. Examples of a VOA that can be incorporated include one or more systems such as a variable neutral density filter, an acousto-optical (AO) modulator (AOM), an AO deflector (AOD), a liquid crystal variable attenuator (LCVA), a micro-electro-mechanical system (MEMS)-based VOA, an optical attenuator wheel, a polarizer/waveplate filter, or the like or any combination thereof.

Another example of such an optical component is a beam size adjustment mechanism operative to selectively and variably adjust a size of the beam of laser energy (also referred to herein as “beam size”) incident upon the scan lens 112. As used herein, the term “beam size” refers to the diameter or width of the beam of laser energy, and can be measured as a radial or transverse distance from the beam axis 118 to where the optical intensity drops to $1/e^2$ of the optical intensity at the axis of propagation along the beam path 116. Examples of a beam size adjustment mechanism that can be incorporated include an AOD system, a zoom lens, a motorized variable beam expander, a deformable mirror, a variable-radius mirror, a variable-focus moiré lens, a motorized Z-axis lens, a motorized iris diaphragm, a motorized aperture wheel, or the like or any combination thereof. Adjusting the beam size of the beam of laser energy incident upon the scan lens 112 can result in a change in spot size at the workpiece 102.

Another example of such an optical component is a beam shape adjustment mechanism operative to selectively and variably adjust a shape of the beam of laser energy (also referred to herein as “beam size”) incident upon the scan lens 112. Examples of a beam shape adjustment mechanism that can be incorporated include an AOD, a deformable mirror, a variable-radius mirror, a variable-focus moire lens, or the like or any combination thereof. Adjusting the beam shape of the beam of laser energy incident upon the scan lens 112 can result in a change in spot shape at the workpiece 102.

A. Laser Source

In one embodiment, the laser source 104 is operative to generate laser pulses. As such, the laser source 104 may include a pulse laser source, a CW laser source, a QCW laser source, a burst mode laser, or the like or any combination thereof. In the event that the laser source 104 includes a QCW or CW laser source, the laser source 104 may further include a pulse gating unit (e.g., an acousto-optic (AO)

modulator (AOM), a beam chopper, etc.) to temporally modulate beam of laser radiation output from the QCW or CW laser source. Although not illustrated, the apparatus 100 may optionally include one or more harmonic generation crystals (also known as "wavelength conversion crystals") configured to convert a wavelength of light output by the laser source 104. In another embodiment, however, the laser source 104 may be provided as a QCW laser source or a CW laser source and not include a pulse gating unit. Thus, the laser source 104 can be broadly characterized as operative to generate a beam of laser energy, which may manifested as a series of laser pulses or as a continuous or quasi-continuous laser beam, which can thereafter be propagated along the beam path 116. Although many embodiments discussed herein make reference to laser pulses, it should be recognized that continuous beams may alternatively, or additionally, be employed whenever appropriate.

Laser light in the UV range of the electromagnetic spectrum may have one or more wavelengths in a range from 10 nm (or thereabout) to 385 nm (or thereabout), such as 10 nm, 121 nm, 124 nm, 157 nm, 200 nm, 334 nm, 337 nm, 351 nm, 380 nm, etc., or between any of these values. Laser light in the visible, green range of the electromagnetic spectrum may have one or more wavelengths in a range from 500 nm (or thereabout) to 560 nm (or thereabout), such as 511 nm, 515 nm, 530 nm, 532 nm, 543 nm, 568 nm, etc., or between any of these values. Laser light in the IR range of the electromagnetic spectrum may have one or more wavelengths in a range from 750 nm (or thereabout) to 15 μm (or thereabout), such as 600 nm to 1000 nm, 752.5 nm, 780 nm to 1060 nm, 799.3 nm, 980 nm, 1047 nm, 1053 nm, 1060 nm, 1064 nm, 1080 nm, 1090 nm, 1152 nm, 1150 nm to 1350 nm, 1540 nm, 2.6 μm to 4 μm, 4.8 μm to 8.3 μm, 9.4 μm, 10.6 μm, etc., or between any of these values.

Laser pulses output by the laser source 104 can have a pulse width or pulse duration (i.e., based on the full-width at half-maximum (FWHM) of the optical power in the pulse versus time) that is in a range from 10 fs to 900 ms. It will be appreciated, however, that the pulse duration can be made smaller than 10 fs or larger than 900 ms. Thus, at least one laser pulse output by the laser source 104 can have a pulse duration less than, greater than or equal to 10 fs, 15 fs, 30 fs, 50 fs, 100 fs, 150 fs, 200 fs, 300 fs, 500 fs, 600 fs, 750 fs, 800 fs, 850 fs, 900 fs, 950 fs, 1 ps, 2 ps, 3 ps, 4 ps, 5 ps, 7 ps, 10 ps, 15 ps, 25 ps, 50 ps, 75 ps, 100 ps, 200 ps, 500 ps, 1 ns, 1.5 ns, 2 ns, 5 ns, 10 ns, 20 ns, 50 ns, 100 ns, 200 ns, 400 ns, 800 ns, 1000 ns, 2 μs, 5 μs, 10 μs, 50 μs, 100 μs, 300 μs, 500 μs, 900 μs, 1 ms, 2 ms, 5 ms, 10 ms, 20 ms, 50 ms, 100 ms, 300 ms, 500 ms, 900 ms, 1 s, etc., or between any of these values.

Laser pulses output by the laser source 104 can have an average power in a range from 5 mW to 50 kW. It will be appreciated, however, that the average power can be made smaller than 5 mW or larger than 50 kW. Thus, laser pulses output by the laser source 104 can have an average power less than, greater than or equal to 5 mW, 10 mW, 15 mW, 20 mW, 25 mW, 50 mW, 75 mW, 100 mW, 300 mW, 500 mW, 800 mW, 1 W, 2 W, 3 W, 4 W, 5 W, 6 W, 7 W, 10 W, 15 W, 18 W, 25 W, 30 W, 50 W, 60 W, 100 W, 150 W, 200 W, 250 W, 500 W, 2 KW, 3 KW, 20 kW, 50 KW, etc., or between any of these values.

Laser pulses can be output by the laser source 104 at a pulse repetition rate in a range from 5 kHz to 1 GHz. It will be appreciated, however, that the pulse repetition rate can be less than 5 kHz or larger than 1 GHz. Thus, laser pulses can be output by the laser source 104 at a pulse repetition rate less than, greater than or equal to 5 kHz, 50 kHz, 100 kHz, 175 kHz, 225 kHz, 250 kHz, 275 kHz, 500 kHz, 800 kHz, 900 kHz, 1 MHz, 1.5 MHz, 1.8 MHz, 1.9 MHz, 2 MHz, 2.5 MHz, 3 MHz, 4 MHz, 5 MHz, 10 MHz, 20 MHz, 50 MHz, 60 MHz, 100 MHz, 150 MHz, 200 MHz, 250 MHz, 300 MHz, 350 MH2, 500 MHz, 550 MHz, 600 MHz, 900 MHz, 2 GHz, 10 GHz, etc., or between any of these values.

In addition to wavelength, pulse duration, average power and pulse repetition rate, laser pulses delivered to the workpiece 102 can be characterized by one or more other characteristics such as pulse energy, peak power, etc., which can be selected (e.g., optionally based on one or more other characteristics such as wavelength, pulse duration, average power and pulse repetition rate, etc.) to irradiate the workpiece 102 at the process spot at an optical intensity (measured in $W/cm^2$), fluence (measured in $J/cm^2$), etc., sufficient to process the workpiece 102 (e.g., to form one or more features having one or more desired characteristics).

Examples of types of lasers that the laser source 104 may be characterized as gas lasers (e.g., carbon dioxide lasers, carbon monoxide lasers, excimer lasers, etc.), solid-state lasers (e.g., Nd: YAG lasers, etc.), rod lasers, fiber lasers, photonic crystal rod/fiber lasers, passively mode-locked solid-state bulk or fiber lasers, dye lasers, mode-locked diode lasers, pulsed lasers (e.g., ms-, ns-, ps-, fs-pulsed lasers), CW lasers, QCW lasers, or the like or any combination thereof. Depending upon their configuration, gas lasers (e.g., carbon dioxide lasers, etc.) may be configured to operate in one or more modes (e.g., in CW mode, QCW mode, pulsed mode, or any combination thereof). Specific examples of laser sources that may be provided as the laser source 104 include one or more laser sources such as: the BOREAS, HEGOA, SIROCCO or CHINOOK series of lasers manufactured by EOLITE; the PYROFLEX series of lasers manufactured by PYROPHOTONICS; the PALADIN Advanced 355, DIAMOND series (e.g., DIAMOND E, G, J-2, J-3, J-5 series), the FLARE NX, MATRIX QS DPSS, MEPHISTO Q, AVIA LX, AVIA NX, RAPID NX, HYPER-RAPID NX, RAPID, HELIOS, FIDELITY, MONACO, OPERA, or RAPID FX series of lasers manufactured by COHERENT; the PALADIN Advanced 355, DIAMOND series (e.g., DIAMOND E, G, J-2, J-3, J-5 series), the ASCEND, EXCELSIOR, EXPLORER, HIPPO, NAVIGATOR, QUATA-RAY, QUASAR, SPIRIT, TALON, or VGEN series of lasers manufactured by SPECTRA PHYSICS; the PULSTAR- or FIRESTAR-series lasers manufactured by SYNRAD; the TRUFLOW-series of lasers (e.g., TRUFLOW 2000, 1700, 3000, 3200, 3600, 4000, 5000, 6000, 6000, 8000, 10000, 12000, 15000, 20000), TRUCOAX series of lasers (e.g., TRUCOAX 1000) or the TRUDISK, TRUPULSE, TRUDIODE, TRUFIBER, or TRUMICRO series of lasers, all manufactured by TRUMPF; the FCPA uJEWEL or FEMTOLITE series of lasers manufactured by IMRA AMERICA; the TANGERINE and SATSUMA series lasers (and MIKAN and T-PULSE series oscillators) manufactured by AMPLITUDE SYSTEMES; CL, CLPF, CLPN, CLPNT, CLT, ELM, ELPF, ELPN, ELPP, ELR, ELS, FLPN, FLPNT, FLT, GLPF, GLPN, GLR, HLPN, HLPP, RFL, TLM, TLPN, TLR, ULPN, ULR, VLM, VLPN, YLM, YLPF, YLPN, YLPP, YLR, YLS, FLPM, FLPMT, DLM, BLM, or DLR series of lasers manufactured by IPG PHOTONICS (e.g., including the GPLN-100-M, GPLN-500-QCW, GPLN-500-M, GPLN-500-R, GPLN-2000-S, etc.), or the like or any combination thereof.

B. First Positioner

The first positioner 106 is arranged, located or otherwise disposed in the beam path 116 and is operative to diffract, reflect, refract, or the like, or any combination thereof, laser pulses that are generated by the laser source 104 (i.e., to "deflect" the laser pulses) so as to deflect or impart movement of the beam path 116 (e.g., relative to the scan lens 112) and, consequently, deflect or impart movement of the beam axis 118 relative to the workpiece 102. Generally, the first positioner 106 is operative to impart movement of the beam axis 118 relative to the workpiece 102 along the X-axis (or direction), the Y-axis (or direction), or a combination thereof. Although not illustrated, the X-axis (or X-direction) will be understood to refer to an axis (or direction) that is orthogonal to the illustrated Y- and Z-axes (or directions).

Movement of the beam axis 118 relative to the workpiece 102, as imparted by the first positioner 106, is generally limited such that the process spot can be scanned, moved or otherwise positioned within a first scan field or "first scanning range" projected by the scan lens 112. Generally, and depending upon one or more factors such as the configuration of the first positioner 106, the location of the first positioner 106 along the beam path 116, the beam size of the laser pulses incident upon the first positioner 106, the spot size, etc., the first scanning range may extend, in any of the X- or Y-directions, to a distance that is less than, greater than or equal to 0.01 mm, 0.04 mm, 0.1 mm, 0.5 mm, 1.0 mm, 1.4 mm, 1.5 mm, 1.8 mm, 2 mm, 2.5 mm, 3.0 mm, 3.5 mm, 4.0 mm, 4.2 mm, 5 mm, 10 mm, 25 mm, 50 mm, 60 mm, etc., or between any of these values. A maximum dimension of the first scanning range (e.g., in the X- or Y-directions, or otherwise) may be greater than, equal to or less than a maximum dimension (as measured in the X-Y plane) of a feature (e.g., an opening, a recess, a via, a trench, etc.) to be formed in the workpiece 102.

Generally, the rate (also referred to as a "positioning rate") with which the first positioner 106 is capable of positioning the process spot at any location within the first scanning range (thus moving the beam axis 118) is in a range from 8 kHz (or thereabout) to 250 MHz (or thereabout). This range is also referred to herein as the first positioning bandwidth. For example, the first positioning bandwidth can be greater than, equal to or less than 8 kHz, 10 kHz, 20 kHz, 30 KHz, 40 kHz, 50 kHz, 75 kHz, 80 kHz, 100 kHz, 250 kHz, 500 kHz, 750 kHz, 1 MHz, 5 MHz, 10 MHz, 20 MHz, 40 MHz, 50 MHz, 75 MHz, 100 MHz, 125 MHz, 150 MHz, 175 MHz, 200 MHz, 225 MHz, 250 MHz, etc., or between any of these values. The inverse of the positioning rate is herein referred to as the "positioning period," and refers to the minimum amount of time necessary to change the position the process spot from one location within the first scanning range to any other location within the first scanning range. Thus, the first positioner 106 can be characterized as having a positioning period that is greater than, equal to or less than 200 μs, 125 μs, 100 μs, 50 μs, 33 μs, 12.5 μs, 10 μs, 4 μs, 2 μs, 1.3 μs, 1 μs, 0.2 μs, 0.1 μs, 0.05 μs, 0.025 μs, 0.02 μs, 0.013 μs, 0.01 μs, 0.008 μs, 0.0067 μs, 0.0057 μs, 0.0044 μs, 0.004 μs, etc., or between any of these values.

The first positioner 106 can be provided as a micro-electro-mechanical-system (MEMS) mirror or mirror array, an AOD system, an electro-optic deflector (EOD) system, a fast-steering mirror (FSM) element (e.g., incorporating a piezoelectric actuator, electrostrictive actuator, voice-coil actuator, etc.), a non-resonant galvanometer mirror system, a resonant scanning galvanometer mirror system, rotating polygon scanner, or the like or any combination thereof. For purposes of discussion herein, a resonant scanning galvanometer mirror system will be referred to as a "resonant scanning mirror system," whereas a non-resonant galvanometer mirror system will simply be referred to as a "galvanometer mirror system." Galvanometer mirror systems typically allow for full position control, but at a position bandwidth (e.g., between 1 and 3 kHz, or thereabout) that is typically lower than a positioning bandwidth of a resonant scanning mirror system (e.g., between 4 and 8 kHz, or thereabout). However, resonant scanning mirror systems typically offer much less position control than galvanometer mirror systems, and the scanning provided for by resonant scanning mirror systems is non-linear. Generally, resonant scanning mirror systems provide sinusoidal scanning, such that the position of a process spot from a beam deflected by a resonant scanning mirror system varies sinusoidally as a function of time. Positioners such as AOD and EOD systems generally have positioning rates that are much larger than those of galvanometer mirror systems (whether of the non-resonant or resonant scanning varieties).

In one embodiment, the first positioner 106 is provided as an AOD system including at least one (e.g., one, two, three, four, etc.) single-element AOD system, at least one (e.g., one, two, three, four, etc.) phased-array AOD system, or the like or any combination thereof. Single-element and phased-array AOD systems each include an AO cell formed of a material such as crystalline Ge, $PbMoO_4$, or $TeO_2$, glassy $SiO_2$, quartz, $As_2S_3$, etc. As used herein, a "single-element" AOD system refers to an AOD system having only a single ultrasonic transducer element acoustically coupled to the AO cell, whereas a "phased-array" AOD system includes a phased-array of at least two ultrasonic transducer elements acoustically coupled to a common AO cell.

As will be recognized by those of ordinary skill, AO technologies (e.g., AODs, AOMs, etc.) utilize diffraction effects caused by acoustic waves propagating through the AO cell to modulate one or more characteristics of an optical wave (i.e., a beam of laser energy, in the context of the present application) contemporaneously propagating through the AO cell. Typically the AO cell is capable of supporting both the acoustic wave and the optical wave in the same region. The acoustic wave imparts a perturbation to the index of refraction in the AO cell. Acoustic waves are typically launched into the AO cell by driving the ultrasonic transducer element at one or more RF frequencies. By controlling characteristics of the acoustic wave (e.g., amplitude, frequency, phase, etc.) one or more characteristics of the propagating optic wave may be controllably modulated to impart movement of the beam path 116 (e.g., relative to the scan lens 112). It should also be recognized that characteristics of an acoustic wave launched into an AO cell can be controlled using well-known techniques to attenuate the energy in a beam of laser energy as it transits the AO cell. Accordingly, an AOD system can also be operated to modulate the pulse energy (and, correspondingly, the fluence, peak power, optical intensity, average power, etc.) of laser pulses ultimately delivered to the workpiece 102.

It will be appreciated that the material from which the AO cell is formed will depend upon the wavelength of the laser pulses that propagate along the beam path 116 so as to be incident upon the AO cell. For example, a material such as crystalline Ge can be used where the wavelength of laser pulses to be deflected is in a range from 2 μm (or thereabout) to 12 μm (or thereabout), materials such as quartz and $TeO_2$ can be used where the wavelength of laser pulses to be deflected is in a range from 200 nm (or thereabout) to 5 μm (or thereabout).

It should be recognized that AOD systems are dispersive elements and, consequently, desirably deflect laser pulses having suitably narrow spectral linewidth (e.g., based on the full-width at half-maximum (FWHM) of the optical power spectral density in the pulse). A laser source 104 operative to generate laser pulses having one or more wavelengths in one or more of the ultra-violet, visible, or NIR range will typically produce laser pulses having a suitably narrow spectral linewidth. Laser sources 104 such as high power CW gas lasers (e.g., carbon dioxide or carbon monoxide CW lasers with an average power greater than about 300 W) and other low power CW or pulsed gas lasers (e.g., with an average power less than about 300 W) can similarly generate laser pulses having a suitably narrow spectral linewidth in the SWIR, MWIR or LWIR range. Conventionally, high power pulsed gas lasers (e.g., carbon dioxide or carbon monoxide pulsed lasers with an average power greater than about 300 W) capable of generating laser pulses are based on a Master Oscillator Power Amplifier (MOPA) laser system architecture.

Any of the AOD systems may be provided as single-axis AOD system (e.g., operative to impart movement of the beam axis 118 along a single direction) or as a multi-axis AOD system (e.g., operative to impart movement of the beam axis 118 along one or more axes, e.g., along the X-axis, along the Y-axis, or any combination thereof) by deflecting the beam path 116. Generally, a multi-axis AOD system can be provided as a multi-cell system or a single-cell system. A multi-cell, multi-axis system typically includes multiple AOD systems, each operative to impart movement of the beam axis 118 along a different axis. For example, a multi-cell, multi-axis system can include a first AOD system (e.g., a single-element or phased-array AOD system) operative to impart movement of the beam axis 118 along the X-axis (e.g., an "X-axis AOD system"), and a second AOD system (e.g., a single-element or phased-array AOD system) operative to impart movement of the beam axis 118 along the Y-axis (e.g., a "Y-axis AOD system"). A single-cell, multi-axis system (e.g., an "X/Y-axis AOD system") typically includes a single AOD system operative to impart movement of the beam axis 118 along the X- and Y-axis. For example, a single-cell system can include at least two ultrasonic transducer elements acoustically coupled to orthogonally-arranged planes, facets, sides, etc., of a common AO cell.

C. Second Positioner

The second positioner 108 is disposed in the beam path 116 and is operative to diffract, reflect, refract, or the like or any combination thereof, laser pulses that are generated by the laser source 104 and passed by the first positioner 106 (i.e., to "deflect" the laser pulses) so as to deflect or impart movement beam path 116 (e.g., relative to the scan lens 112) and, consequently, deflect or impart movement of the beam axis 118 relative to the workpiece 102. Generally, the second positioner 108 is operative to impart movement of the beam axis 118 relative to the workpiece 102 along the X-axis (or direction), the Y-axis (or direction), or a combination thereof.

Movement of the beam axis 118 relative to the workpiece 102, as imparted by the second positioner 108, is generally limited such that the process spot can be scanned, moved or otherwise positioned within a second scan field or "second scanning range" projected by the scan lens 112. Generally, and depending upon one or more factors such as the configuration of the second positioner 108, the location of the second positioner 108 along the beam path 116, the beam size of the laser pulses incident upon the second positioner 108, the spot size, etc., the second scanning range may extend, in any of the X- or Y-directions to a distance that is greater than a corresponding distance of the first scanning range. In view of the above, the second scanning range may extend, in any of the X- or Y-directions, to a distance that is less than, greater than or equal to 1 mm, 25 mm, 50 mm, 75 mm, 100 mm, 250 mm, 500 mm, 750 mm, 1 cm, 25 cm, 50 cm, 75 cm, 1 m, 1.25 m, 1.5 m, etc., or between any of these values. A maximum dimension of the second scanning range (e.g., in the X- or Y-directions, or otherwise) may be greater than, equal to or less than a maximum dimension (as measured in the X-Y plane) of a feature (e.g., an opening, a recess, a via, a trench, a scribe line, a conductive trace, etc.) to be formed in the workpiece 102.

In view of the configuration described herein, it should be recognized that movement of the beam axis 118 imparted by the first positioner 106 can be superimposed by movement of the beam axis 118 imparted by the second positioner 108. Thus, the second positioner 108 is operative to scan the first scanning range within the second scanning range.

Generally, the positioning rate with which the second positioner 108 is capable of positioning the process spot at any location within the second scanning range (thus moving the beam axis 118 within the second scanning range and/or scanning the first scanning range within the second scanning range) spans a range (also referred to herein as the "second positioning bandwidth") that is less than the first positioning bandwidth. In one embodiment, the second positioning bandwidth is in a range from 500 Hz (or thereabout) to 8 kHz (or thereabout). For example, the second positioning bandwidth can be greater than, equal to or less than 500 Hz, 750 Hz, 1 kHz, 1.25 kHz, 1.5 kHz, 1.75 kHz, 2 kHz, 2.5 kHz, 3 kHz, 3.5 kHz, 4 kHz, 4.5 kHz, 5 kHz, 5.5 kHz, 6 kHz, 6.5 kHz, 7 kHz, 7.5 kHz, 8 kHz, etc., or between any of these values.

In view of the above, it should be appreciated that the second positioner 108 can be provided as a micro-electro-mechanical-system (MEMS) mirror or mirror array, an AOD system, an electro-optic deflector (EOD) system, a fast-steering mirror (FSM) element (e.g., incorporating a piezoelectric actuator, electrostrictive actuator, voice-coil actuator, etc.), a galvanometer mirror system, a resonant scanning mirror system, rotating polygon scanner, or the like or any combination thereof. In one embodiment, the second positioner 108 can be provided as a galvanometer mirror system including two galvanometer mirror components, i.e., a first galvanometer mirror component (e.g., an X-axis galvanometer mirror component) arranged to impart movement of the beam axis 118 relative to the workpiece 102 along the X-axis and a second galvanometer mirror component (e.g., a Y-axis galvanometer mirror component) arranged to impart movement of the beam axis 118 relative to the workpiece 102 along the Y-axis. In another embodiment, however, the second positioner 108 may be provided as a galvanometer mirror system including a single galvanometer mirror component arranged to impart movement of the beam axis 118 relative to the workpiece 102 along the X- and Y-axes. In yet other embodiments, the second positioner 108 may be provided as a rotating polygon mirror system, etc. It will thus be appreciated that, depending on the specific configuration of the second positioner 108 and the first positioner 106, the second positioning bandwidth may be greater than or equal to the first positioning bandwidth.

D. Third Positioner

The third positioner 110 is operative to impart movement of the workpiece 102 relative to the scan lens 112, and, consequently, impart movement of the workpiece 102 relative to the beam axis 118. Movement of the workpiece 102 relative to the beam axis 118 is generally limited such that the process spot can be scanned, moved or otherwise positioned within a third scan field or "third scanning range." Depending upon one or more factors such as the configuration of the third positioner 110, the third scanning range may extend, in any of the X- or Y-directions to a distance that is greater than or equal to a corresponding distance of the second scanning range. Generally, however, a maximum dimension of the third scanning range (e.g., in the X- or Y-directions, or otherwise) will be greater than or equal to a corresponding maximum dimension (as measured in the X-Y plane) of any feature to be formed in the workpiece 102. Optionally, the third positioner 110 may be operative to move the workpiece 102 relative to the beam axis 118 within a scanning range that extends in the Z-direction (e.g., over a range between 1 mm and 50 mm). Thus, the third scanning range may extend along the X-, Y- and/or Z-directions.

In view of the configuration described herein, it should be recognized that movement of the process spot relative to the workpiece 102 (e.g., as imparted by the first positioner 106 and/or the second positioner 108) can be superimposed by movement of the workpiece 102 as imparted by the third positioner 110. Thus, the third positioner 110 is operative to scan the first scanning range and/or second scanning range within the third scanning range. Generally, the positioning rate with which the third positioner 110 is capable of positioning the workpiece 102 at any location within the third scanning range (thus moving the workpiece 102, scanning the first scanning range within the third scanning range, and/or scanning the second scanning range within the third scanning range) spans a range (also referred to herein as the "third positioning bandwidth") that is less than the second positioning bandwidth. In one embodiment, the third positioning bandwidth is less than 500 Hz (or thereabout). For example, the third positioning bandwidth can be equal to or less than 500 Hz, 250 Hz, 150 Hz, 100 Hz, 75 Hz, 50 Hz, 25 Hz, 10 Hz, 7.5 Hz, 5 Hz, 2.5 Hz, 2 Hz, 1.5 Hz, 1 Hz, etc., or between any of these values.

In one embodiment, the third positioner 110 is provided as one or more linear stages (e.g., each capable of imparting translational movement to the workpiece 102 along the X-, Y- and/or Z-directions), one or more rotational stages (e.g., each capable of imparting rotational movement to the workpiece 102 about an axis parallel to the X-, Y- and/or Z-directions), or the like or any combination thereof. In one embodiment, the third positioner 110 includes an X-stage for moving the workpiece 102 along the X-direction, and a Y-stage supported by the X-stage (and, thus, moveable along the X-direction by the X-stage) for moving the workpiece 102 along the Y-direction. Although not shown, the apparatus 100 may also include an optional base (e.g., a granite block) that supports the third positioner 110.

Although not shown, the apparatus 100 may, optionally, include a fixture (e.g., a chuck) coupled to a stage of the third positioner 110. The fixture can include a support region and the workpiece 102 can be mechanically clamped, fixed, held, secured to the fixture or be otherwise supported by the fixture within the support region. In one embodiment, the workpiece 102 can be clamped, fixed, held, secured or be otherwise supported so as to directly contact a main, typically flat, support surface of the fixture. In another embodiment, the workpiece 102 can be clamped, fixed, held, secured or be otherwise supported so as to be spaced apart from the support surface of the fixture. In one embodiment, the workpiece 102 can be fixed, held, or secured by way of a force (e.g., an electrostatic force, a vacuum force, a magnetic force) selectively applied to the workpiece 102 from the fixture, or otherwise present between the workpiece 102 and the fixture.

As described thus far, the apparatus 100 employs a so-called "stacked" positioning system as the third positioner 110, which enables the workpiece 102 to be moved while positions of other components such as the first positioner 106, second positioner 108, scan lens 112, etc., are kept stationary within the apparatus 100 (e.g., via one or more supports, frames, etc., as is known in the art) relative to the workpiece 102. In another embodiment, the third positioner 110 may be arranged and operative to move one or more components such as the first positioner 106, second positioner 108, scan lens 112, etc., and the workpiece 102 may be kept stationary.

In yet another embodiment, the third positioner 110 can be provided as a so-called "split-axis" positioning system in which one or more components such as the first positioner 106, second positioner 108, scan lens 112, or the like or any combination thereof, are carried by one or more linear or rotational stages (e.g., mounted on a frame, gantry, etc.) and the workpiece 102 is carried by one or more other linear or rotational stages. In such an embodiment, the third positioner 110 includes one or more linear or rotational stages arranged and operative to move one or more components such as the scan head (e.g., including the second positioner 108 and scan lens 112) and one or more linear or rotational stages arranged and operative to move the workpiece 102. For example, the third positioner 110 may include a Y-stage for imparting movement of the workpiece 102 along the Y-direction and an X-stage for imparting movement of the scan head along the X-direction. Some examples of split-axis positioning systems that may be beneficially or advantageously employed in the apparatus 100 include any of those disclosed in U.S. Pat. Nos. 5,751,585, 5,798,927, 5,847,960, 6,606,999, 7,605,343, 8,680,430, 8,847,113, or in U.S. Patent App. Pub. No. 2014/0083983, or any combination thereof, each of which is incorporated herein by reference in its entirety.

In one embodiment in which the third positioner 110 includes a Z-stage, the Z-stage may be arranged and configured to move the workpiece 102 along the Z-direction. In this case, the Z-stage may be carried by one or more of the other aforementioned stages for moving or positioning the workpiece 102, may carry one or more of the other aforementioned stages for moving or positioning the workpiece 102, or any combination thereof. In another embodiment in which the third positioner 110 includes a Z-stage, the Z-stage may be arranged and configured to move the scan head along the Z-direction. Thus, in the case where the third positioner 110 is provided as a split-stage positioning system, the Z-stage may carry, or be carried by, the X-stage. Moving the workpiece 102 or the scan head along the Z-direction can result in a change in spot size at the workpiece 102.

In still another embodiment, one or more components such as the first positioner 106, second positioner 108, scan lens 112, etc., may be carried by an articulated, multi-axis robotic arm (e.g., a 2-, 3-, 4-, 5-, or 6-axis arm). In such an embodiment, the second positioner 108 and/or scan lens 112 may, optionally, be carried by an end effector of the robotic arm. In yet another embodiment, the workpiece 102 may be carried directly on an end effector of an articulated, multi-axis robotic arm (i.e., without the third positioner 110). In still another embodiment, the third positioner 110 may be carried on an end effector of an articulated, multi-axis robotic arm.

D. Scan Lens

The scan lens 112 (e.g., provided as either a simple lens, or a compound lens) is generally configured to focus laser pulses directed along the beam path, typically so as to produce a beam waist that can be positioned at or near the desired process spot. The scan lens 112 may be provided as an f-theta lens, a telecentric lens, an axicon lens (in which case, a series of beam waists are produced, yielding a plurality of process spots displaced from one another along the beam axis 118), or the like or any combination thereof. In one embodiment, the scan lens 112 is provided as a fixed-focal length lens and is coupled to a scan lens positioner (e.g., a lens actuator, not shown) operative to move the scan lens 112 (e.g., so as to change the position of the beam waist along the beam axis 118). For example, the lens actuator may be provided as a voice coil operative to linearly translate the scan lens 112 along the Z-direction. In this case, the scan lens 112 may be formed of a material such as fused silica, optical glass, zinc selenide, zinc sulfide, germanium, gallium arsenide, magnesium fluoride, etc. In another embodiment, the scan lens 112 is provided as a variable-focal length lens (e.g., a zoom lens, or a so-called "liquid lens" incorporating technologies currently offered by COGNEX, VARIOPTIC, etc.) capable of being actuated (e.g., via a lens actuator) to change the position of the beam waist along the beam axis 118. Changing the position of the beam waist along the beam axis 118 can result in a change in spot size at the workpiece 102.

In one embodiment, the scan lens 112 and the second positioner 108 are integrated into a common housing or "scan head." Thus, in an embodiment in which the apparatus 100 includes a lens actuator, the lens actuator may be coupled to the scan lens 112 (e.g., so as to enable movement of the scan lens 112 within the scan head, relative to the second positioner 108). Alternatively, the lens actuator may be coupled to the scan head (e.g., so as to enable movement of the scan head itself, in which case the scan lens 112 and the second positioner 108 would move together). In another embodiment, the scan lens 112 and the second positioner 108 are integrated into different housings (e.g., such that the housing in which the scan lens 112 is integrated is movable relative to the housing in which the second positioner 108 is integrated). Components of the scan head, or the entire scan head itself, may be of a modular assembly, such that a component of the scan head can be simply removed and replaced with another component, such that one scan head can be simply removed and replaced with another scan head, etc.

E. Vision

The apparatus 100 may further include one or more cameras, such as camera 113 (e.g., a CCD camera, a CMOS camera, or the like or any combination thereof), having a field of view that encompasses a region occupied by the workpiece 102 provided to the apparatus 100 for processing. The camera 113 may be coupled to the scan lens 112 or to the aforementioned scan head. The camera 113 can generate image data representative of imagery captured within its field of view and output the image data (e.g., as one or more image signals) to the controller 114.

Image data can be interpreted, manipulated, inputted to an algorithm or otherwise processed (e.g., at the controller 114, the remote system 126, or the like or any combination thereof) in any desired or otherwise suitable manner known in the art to facilitate one or more operations such as alignment of the workpiece 102 within the apparatus 100, calibration, visual inspection (e.g., of features formed as a result of processing the workpiece 102), or the like or any combination thereof.

Although FIG. 1 illustrates the apparatus 100 as including only one camera 113, it will be appreciated that multiple cameras 113 (e.g., differing in terms of resolution, field of view, or the like or any combination thereof). For example, in one embodiment, the apparatus 100 may include a first camera and a second camera. The first camera may have a relatively large field of view and a relatively low resolution whereas the second camera may have a relatively small field of view and a relatively high resolution. Generally, the field of view of the second camera will be located within the field of view of the first camera. However, the first and second cameras can be arranged such that the field of view of the second camera is located outside the field of view of the first camera.

F. Controller

Generally, the apparatus 100 includes one or more controllers, such as controller 114, to control, or facilitate control of, the operation of the apparatus 100. In one embodiment, the controller 114 is communicatively coupled (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof) to one or more components of the apparatus 100, such as the laser source 104, the first positioner 106, the second positioner 108, third positioner 110, the lens actuator, the scan lens 112 (when provided as a variable-focal length lens), the fixture, the camera 113, the VOA, the beam size adjustment mechanism, etc., which are thus operative in response to one or more control signals output by the controller 114.

For example, the controller 114 may control an operation of the first positioner 106, second positioner 108, or third positioner 110, to impart relative movement between the beam axis and the workpiece so as to cause relative movement between the process spot and the workpiece 102 along a path or trajectory (also referred to herein as a "process trajectory") within the workpiece 102. It will be appreciated that any two of these positioners, or all three of these positioners, may be controlled such that two positioners (e.g., the first positioner 106 and the second positioner 108, the first positioner 106 and the third positioner 110, or the second positioner 108 and the third positioner 110), or all three positioners simultaneously impart relative movement between the process spot and the workpiece 102 (thereby imparting a "compound relative movement" between the beam axis and the workpiece). Of course, at any time, it is possible to control only one positioner (e.g., the first positioner 106, the second positioner 108 or the third positioner 110) to impart relative movement between the process spot and the workpiece 102 (thereby imparting a "non-compound relative movement" between the beam axis and the workpiece).

Some other examples of operations that one or more of the aforementioned components can be controlled to perform include any operations, functions, processes, and methods, etc., as disclosed in aforementioned U.S. Pat. Nos. 5,751,585, 5,847,960, 6,606,999, 8,680,430, 8,847,113, or as disclosed in U.S. Pat. Nos. 4,912,487, 5,633,747, 5,638,267, 5,917,300, 6,314,463, 6,430,465, 6,600,600, 6,606,998, 6,816,294, 6,947,454, 7,019,891, 7,027,199, 7,133,182, 7,133,186, 7,133,187, 7,133,188, 7,244,906, 7,245,412, 7,259,354, 7,611,745, 7,834,293, 8,026,158, 8,076,605, 8,288,679, 8,404,998, 8,497,450, 8,648,277, 8,896,909, 8,928,853, 9,259,802, or in U.S. Patent App. Pub. Nos. 2014/0026351, 2014/0196140, 2014/0263201, 2014/0263212, 2014/0263223, 2014/0312013, or in German Patent No. DE102013201968B4, or in International Patent Pub. No. WO2009/087392, or any combination thereof, each of which is incorporated herein by reference in its entirety. In another example, the controller 114 may control an operation of any positioner that includes one or more AOD systems (e.g., in some embodiments, the first positioner 106, the second positioner 108, or a combination thereof) to change the spot shape or spot size of laser pulses delivered to the process spot (e.g., by chirping an RF signal applied to one or more ultrasonic transducer elements of the one or more AOD systems, by applying a spectrally-shaped RF signal to one or more ultrasonic transducer elements of the one or more AOD systems, or the like or any combination thereof) as, for example, disclosed in International Patent Pub. No. WO2017/044646A1, which is incorporated herein by reference in its entirety. The applied RF signal may be chirped linearly, or non-linearly, in any desired or suitable manner. For example, the applied RF signal may be chirped at a first rate and then at a second rate to diffract a laser pulse transiting the AO cell in two different manners. In this case, the first rate may be slower than or faster than the second rate.

Generally, the controller 114 includes one or more processors operative to generate the aforementioned control signals upon executing instructions. A processor can be provided as a programmable processor (e.g., including one or more general purpose computer processors, microprocessors, digital signal processors, or the like or any combination thereof) operative to execute the instructions. Instructions executable by the processor(s) may be implemented software, firmware, etc., or in any suitable form of circuitry including programmable logic devices (PLDs), field-programmable gate arrays (FPGAs), field-programmable object arrays (FPOAs), application-specific integrated circuits (ASICs)—including digital, analog and mixed analog/digital circuitry—or the like, or any combination thereof. Execution of instructions can be performed on one processor, distributed among processors, made parallel across processors within a device or across a network of devices, or the like or any combination thereof.

In one embodiment, the controller 114 includes tangible media such as computer memory, which is accessible (e.g., via one or more wired or wireless communications links) by the processor. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or a combination thereof. Generally, the instructions may be stored as computer software (e.g., executable code, files, instructions, etc., library files, etc.), which can be readily authored by artisans, from the descriptions provided herein, e.g., written in C, C++, Visual Basic, Java, Python, Tel, Perl, Scheme, Ruby, assembly language, hardware description language (e.g., VHDL, VERILOG, etc.), etc. Computer software is commonly stored in one or more data structures conveyed by computer memory.

Although not shown, one or more drivers (e.g., RF drivers, servo drivers, line drivers, power sources, etc.) can be communicatively coupled to an input of one or more components such as the laser source 104, the first positioner 106, the second positioner 108, the third positioner 110, the lens actuator, the scan lens 112 (when provided as a variable-focal length lens), the fixture, the camera 113, the VOA, the beam size adjustment mechanism, etc. In one embodiment, each driver typically includes an input to which the controller 114 is communicatively coupled and the controller 114 is thus operative to generate one or more control signals (e.g., trigger signals, etc.), which can be transmitted to the input(s) of one or more drivers associated with one or more components of the apparatus 100. Thus, components such as the laser source 104, first positioner 106, second positioner 108, third positioner 110, lens actuator, the scan lens 112 (when provided as a variable-focal length lens), fixture, camera 113, the VOA, the beam size adjustment mechanism, etc., are responsive to control signals generated by the controller 114.

In another embodiment, and although not shown, one or more additional controllers (e.g., component-specific controllers) may, optionally, be communicatively coupled to an input of a driver communicatively coupled to a component (and thus associated with the component) such as the laser source 104, the first positioner 106, the second positioner 108, the third positioner 110, the lens actuator, the scan lens 112 (when provided as a variable-focal length lens), the fixture, the camera 113, the VOA, the beam size adjustment mechanism, etc. In this embodiment, each component-specific controller can be communicatively coupled and the controller 114 and be operative to generate, in response to one or more control signals received from the controller 114, one or more control signals (e.g., trigger signals, etc.), which can then be transmitted to the input(s) of the driver(s) to which it is communicatively coupled. In this embodiment, a component-specific controller may be operative as similarly described with respect to the controller 114.

In another embodiment in which one or more component-specific controllers are provided, the component-specific controller associated with one component (e.g., the laser source 104) can be communicatively coupled to the component-specific controller associated with one component (e.g., the first positioner 106, etc.). In this embodiment, one or more of the component-specific controllers can be operative to generate one or more control signals (e.g., trigger signals, etc.) in response to one or more control signals received from one or more other component-specific controllers.

G. User Interface

The apparatus 100 may further include a user interface 120 communicatively coupled to the controller 114 (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof). The user interface 120 can include one or more output devices, one or more input devices, or any combination thereof. Generally, an output device is any device capable of rendering or otherwise conveying information through any human-perceptible stimuli (e.g., visual, audible, tactile, etc.). Examples of output devices include monitor, a printer, a speaker, a haptic actuator, and the like. Generally, an input device is any device that enables, e.g., a user of the apparatus 100, to provide instructions, commands, parameters, information, or the like, to operate the apparatus 100 (or to facilitate operation of the apparatus 100). Examples of input devices include a keyboard, mouse, touchpad, touchscreen, microphone, a camera, and the like.

H. Communications Module

Optionally, the apparatus 100 includes a communications module 122 communicatively coupled to the controller 114 (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof). The communications module 122 is operative to transmit data, receive data, or a combination thereof. Accordingly, the communications module 122 can include circuitry, antennas, connectors, or the like or any combination thereof, to transmit and/or receive data through a wired or wireless link to another device or network (e.g., network 124). In one example, the communications module 122 can be a connector that operates in conjunction with software or firmware in the controller 114 to function as a serial port (e.g., RS232), a Universal Serial Bus (USB) port, an IR interface or the like or any combination thereof. In another example, the communications module 122 can be a universal interface driver application specific integrated circuit (UIDA) that supports plural different host interface protocols, such as RS-232C, IBM46XX, Keyboard Wedge interface, or the like or any combination thereof. The communications module 122 may include one or more modules, circuits, antennas, connectors, or the like, as known in the art, to support other known communication modes, such as USB, Ethernet, Bluetooth, wifi, infrared (e.g., IrDa), RFID communication, or the like or any combination thereof. Instead of being a separate component from the controller 114, it will be appreciated that the communications module 122 may be incorporated as part of the controller 114 in any known or suitable manner.

The network 124 may be communicatively coupled (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof) to one or more systems remote to the apparatus 100 (e.g., remote system 126, as identified in FIG. 1). In one embodiment, the remote system 126 may be a device such as a computer (e.g., a desktop computer, a laptop computer, a tablet computer, a smartphone, etc.), a computing system (e.g., a cloud computing platform), another controller or communications module (e.g., associated with another apparatus such as apparatus 100), or the like or any combination thereof. The remote system 126 can be a device owned or otherwise operated by a user of the apparatus 100, by a manufacturer of the apparatus 100, by a technician responsible for performing maintenance on the apparatus 100, or the like or any combination thereof.

Through the communications module 122 and network 124, the controller 114 may communicate various data to the remote system 126. Examples of data that can thus be output to the remote system 126 include the aforementioned image data, or measurement data or notification data (both discussed in greater detail below), or the like or any combination thereof. Data output by the remote system 126 may be input to the controller 114 (e.g., via the network 124 and communications module 122) and represent instructions, commands, parameters, information, or the like, to operate the apparatus 100 or to otherwise influence or facilitate any operation of the apparatus 100.

I. Beam Characterization Tool

Optionally, the apparatus 100 includes one or more beam characterization tools, such as beam characterization tool 128, operative to measure one or more characteristics of the beam of laser energy. Examples of characteristics that can be measured at the beam characterization tool 128 include spatial energy distribution, phase, polarization, power, or the like or any combination thereof, of a spot illuminated at the beam characterization tool 128 by the incident beam of laser energy. Accordingly, the beam characterization tool 128 can be provided as at least one sensor selected from the group consisting of a slit sensor, a knife-edge sensor, a camera (e.g., CCD, CMOS, etc.), a wavefront sensor (e.g., a Shack-Hartmann wavefront sensor, etc.), or any other laser beam profiler known in the art, or the like or any combination thereof. The beam characterization tool 128 can generate measurement data representative of one or more of the measured beam characteristics and output the measurement data (e.g., as one or more measurement signals) to the controller 114. Optionally, the measurement data (or data derived from the measurement data, e.g., by the controller 114) can be transmitted from the controller 114 to the remote system 126 (e.g., via the communications module 122 and network 124).

As schematically shown in FIG. 1, the beam characterization tool 128 can be configured and arranged to measure one or more characteristics of the beam of laser energy (each also generically referred to herein as a "beam characteristic") in any manner known in the art. For example, the beam characterization tool 128 is arranged to measure one or more characteristics of the beam of laser energy (e.g., as indicated by arrow 128*a*) at or near a location within where the workpiece 102 will be processed by the beam of laser energy (also referred to herein as a "process region"), from a location (i.e., a sampling location) along the beam path 116, or any combination thereof. In one embodiment, the sampling location can be between the second positioner 108 and the scan lens 112 (e.g., as indicated by arrow 128*b*), between the first positioner 106 and the second positioner 108, between the laser source 104 and the first positioner 106, or the like.

In another embodiment, the camera 113 (e.g., the first camera, the second camera, or the like or any combination thereof) can be operated to capture imagery of the spot at the workpiece 102, at the fixture, at an area outside the fixture, or the like or any combination thereof. Thereafter, in one implementation, the captured imagery can thereafter be processed at the camera 113 so that the image data generated by the camera 113 represents the spatial energy distribution of the spot. In this case, the image data output by the camera 113 can be considered "measurement data," and the camera 113 can be considered to be an embodiment of the beam characterization tool 128.

i. Measurement from Process Region

Figure 2:
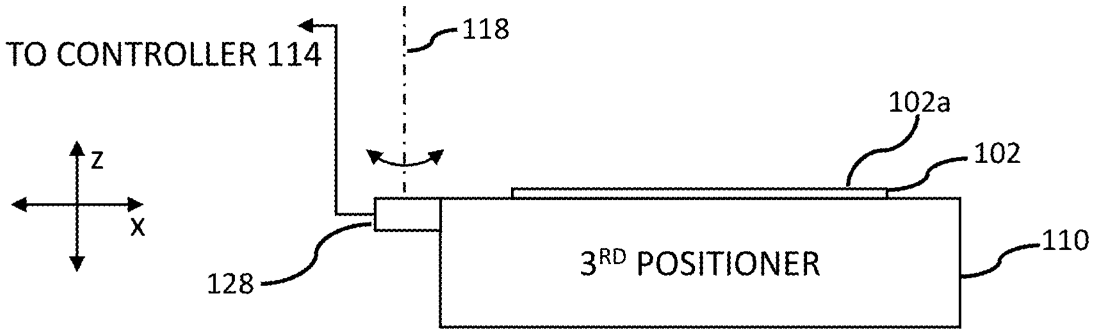
FIGS. 2 and 3 schematically illustrate an operation of the third positioner 110 having a beam characterization tool mounted thereto, for measurement a beam characteristic, according to one embodiment.
Figure 3:
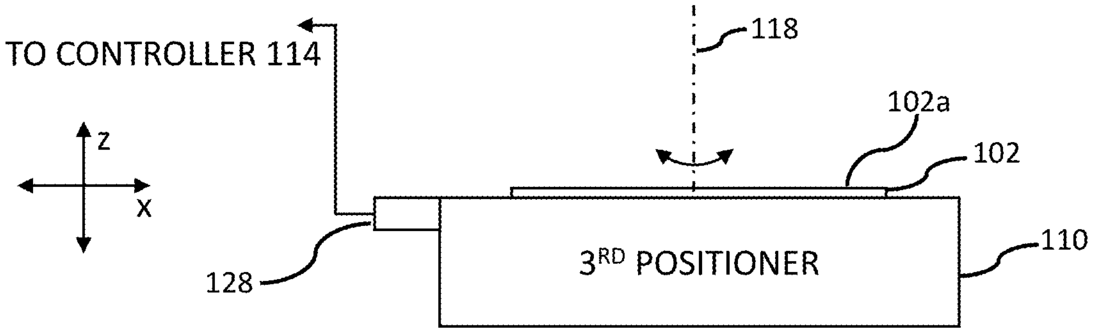

In one embodiment, and with reference to FIGS. 2 and 3, the beam characterization tool 128 can be mounted to the third positioner 110 at a location outside the aforementioned support region of a fixture (not shown) provided with the third positioner 110. For example, the third positioner 110 can include one or more linear stages (e.g., as described above) and the beam characterization tool 128 can be mounted to the same linear stage (e.g., at a side surface thereof) to which the fixture is coupled. In another embodiment, the beam characterization tool 128 can be mounted to the fixture itself instead of to the linear stage. To facilitate measurement of a beam characteristic, the third positioner 110 can be operated to move the beam characterization tool 128 to a location that intersects the beam axis 118 (e.g., as shown in FIG. 2). After a beam characteristic has been measured, the third positioner 110 can be operated to move the support region of the fixture (e.g., on which the workpiece 102 is supported) such that the beam axis 118 can intersect with the workpiece 102 (e.g., as shown in FIG. 3).

Figure 4:
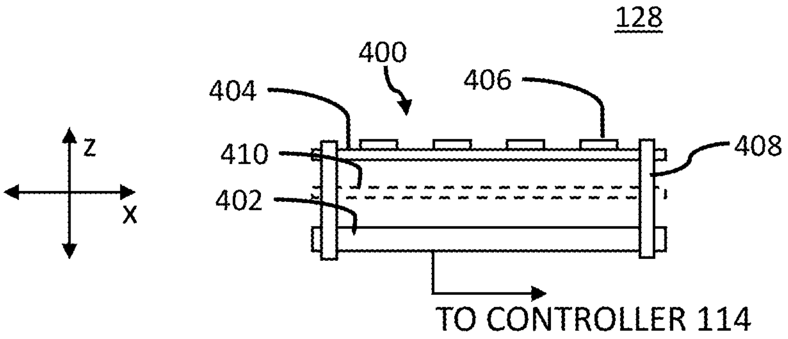
FIG. 4 schematically illustrates a beam characterization tool shown in FIGS. 2 and 3, according to one embodiment.

Referring to FIG. 4, the beam characterization tool 128 can include a token 400 overlying a photodetector 402. The token 400 can, for example, include a substrate 404 and a pattern of non-transmissive targets 406 formed on the substrate 404. The token 400 can be fixed over the photodetector 402 by means of a frame (e.g., frame 408). The substrate 404 is formed of a material (e.g., typically, glass) that is transparent (or at least substantially transparent) to beam of laser energy propagating along the beam axis 118. By contrast, the targets 406 are typically formed of a material (e.g., typically, chrome or an alloy thereof) that reflects or absorbs the beam of laser energy propagating along the beam axis 118.

The size, shape or other configuration of the targets 406 may be provided in any matter as desired or beneficial. For example, and with reference to FIG. 5, the targets 406 may be arranged to form a "target grid" including solid square-shaped targets (e.g., as identified at 500), solid diamond-shaped targets (e.g., as identified at 502), hollow square-shaped targets (e.g., as identified at 504), or the like or any combination thereof. Square-shaped targets (e.g., as identified at 500 and 504) have sides that are oriented to the X- and Y-axes (e.g., at 0 and 90 degrees, as measured from the X-axis). The diamond-shaped target (e.g., as identified at 502) has sides that are offset from the X- and Y-axes (e.g., at 45 and 135 degrees, as measured from the X-axis).

Figure 5:
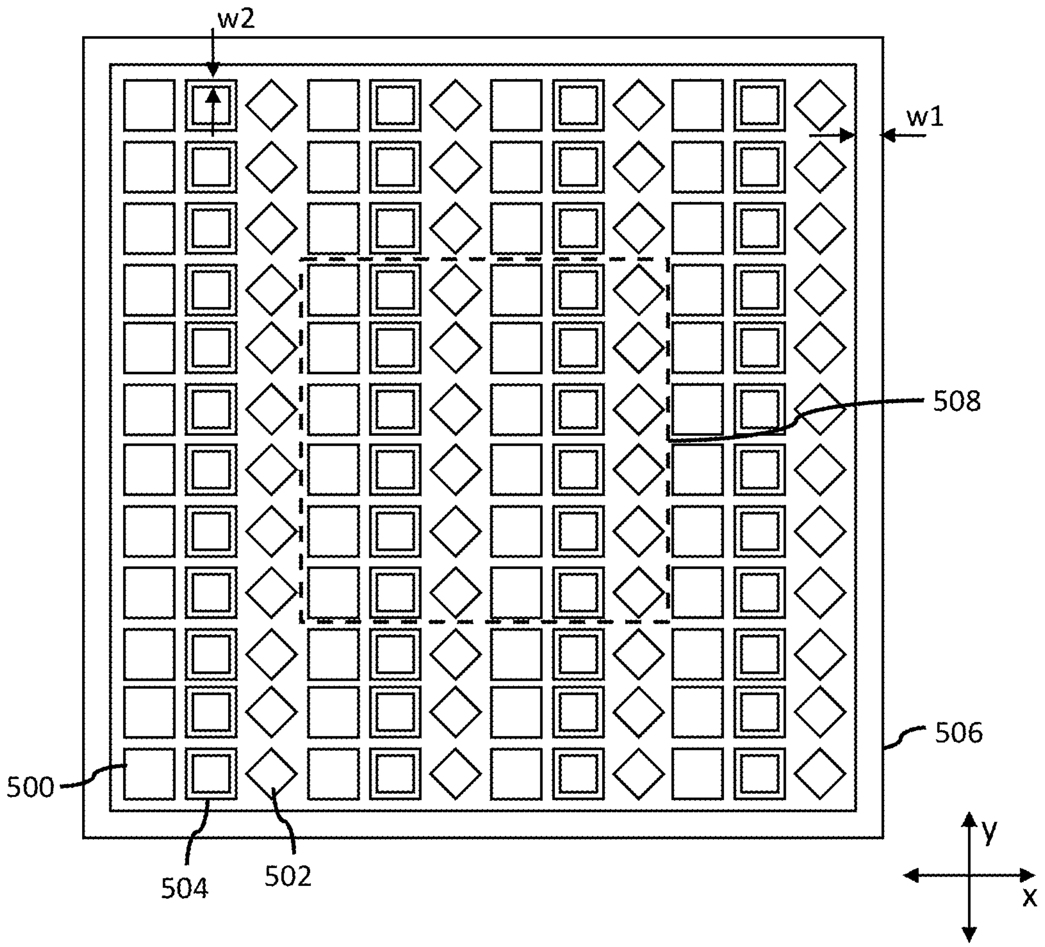
FIG. 5 schematically illustrates an arrangement of targets on a substrate of the beam characterization tool shown in FIG. 4, according to another embodiment.

The target grid may, optionally, include a peripheral target (e.g., as shown at 506) that encompasses the solid square-shaped, solid diamond-shaped and hollow square-shaped targets 500, 502 and 504. Although FIG. 5 illustrates a 12×12 array of targets 406 (i.e., of targets 500, 502 and 504), it will be appreciated that any number of targets 406 may be provided, and arranged in any desired or beneficial manner. The target grid may have a length and/or width in a range from 10 mm to 30 mm (e.g., 20 mm, or thereabout). Individual sides of the peripheral target 506 may have a width, w1, in a range from 1 mm to 5 mm (e.g., 2.5 mm, or thercabout), and targets 500, 502 and 504 can have maximal dimensions (e.g., in the X- or Y-directions) in a range from 100 μm to 500 μm (e.g., 250 μm, or thereabout). The side of the hollow square-shaped target 504 can have a width, w2, in a range from 5 μm to 15 μm (e.g., 10 μm, or thereabout).

In one embodiment, the beam of laser energy transmitted by the scan lens 112 can illuminate a spot on a target 406 of the token 400 at a fluence (e.g., a first fluence) that is sufficiently high so as to be able to melt or ablate the material from which the target 406 is formed. In such an embodiment, the photodetector 402 has an active area (i.e., the region of the photodetector that is capable of detecting light, indicated in FIG. 5 as the region enclosed by the dashed-line square 508) that is smaller than the area of the target grid (i.e., when viewed in the top plan view illustrated in FIG. 5). The active area 508 of the photodetector 402 can have sides measuring 5 mm to 20 mm in length (e.g., 10 mm, or thereabout).

In another embodiment, the beam of laser energy transmitted by the scan lens 112 illuminates a spot on a target 406 of the token 400 at a fluence (e.g., a second fluence) that is insufficient to melt or ablate the material from which the target 406 is formed, but that is sufficiently high so as to be able to damage the photodetector 402. In this case, and with reference to FIG. 4, the beam characterization tool 128 can include an optical filter 410 (e.g., a neutral-density filter) interposed between the token 400 and the photodetector 402 to reduce the fluence of the transmitted beam of laser energy transmitted incident upon the photodetector 402 (e.g., to a fluence that is less than the second fluence) to prevent the photodetector 402 from becoming damaged.

In yet another embodiment, the beam of laser energy transmitted by the scan lens 112 illuminates a spot on a target 406 of the token 400 at a fluence (e.g., a third fluence) that is insufficient to melt or ablate the material from which the target 406 is formed, and that is insufficient to damage the photodetector 402. In this case, the optical filter 410 can be omitted from the beam characterization tool 128.

In one embodiment, the operation of one or more components of the apparatus 100 can be selectively controlled (e.g., via the controller 114, the user interface 120, the remote system 126, or the like or any combination thereof) to ensure that the spot illuminated at the target 406 is at the first fluence or the second fluence. Likewise, the operation of one or more components of the apparatus 100 can be selectively controlled (e.g., via the controller 114, the user interface 120, the remote system 126, or the like or any combination thereof) to ensure that the spot illuminated at the photodetector 402 is at the second fluence or the third fluence.

ii. Measurement from Beam Path

Figure 6:
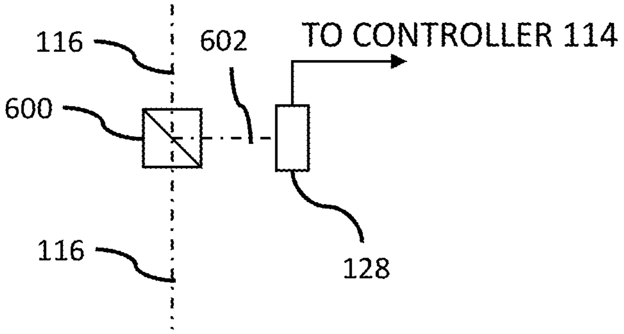
FIG. 6 schematically illustrates a beam characterization tool shown in FIGS. 2 and 3, according to another embodiment.

In one embodiment, and with reference to FIG. 6, the apparatus 100 can include a beam splitter 600 (e.g., a beam splitter cube as illustrated, a partially-reflecting mirror, a fiber-optic beam splitter, or the like or any combination thereof) arranged at a location (i.e., the aforementioned "sampling location") within the beam path 116. The beam splitter 600 can be between the second positioner 108 and the scan lens 112, between the first positioner 106 and the second positioner 108, between the laser source 104 and the first positioner 106, or the like. Generally, however, the beam splitter 600 splits an incident beam of laser energy into a process beam and a sample beam. The process beam propagates along the beam path 116 (e.g., so as to be ultimately transmitted through the scan lens 112) and the sample beam propagates along beam path 602 to the beam characterization tool 128.

J. Laser Sensor System

In one embodiment, the apparatus 100 includes a laser sensor system configured to measure laser energy or power. Measurement data generated by the laser sensor system (e.g., in response to measuring the laser energy or power) is output to the controller 114 (and, optionally, to the remote system 126), where it can be processed to support various functions such as real-time pulse energy control (e.g., to compensate for changes in laser power), system calibrations (e.g., to compensate for transmission changes in the AOD systems of the first positioner 106 vs. RF power and frequency, etc.), or the like or any combination thereof. Examples of functions that may be implemented using measurement data from the laser sensor system are discussed in aforementioned U.S. Pat. No. 7,244,906, or in aforementioned U.S. Patent App. Pub. Nos. 2014/0196140, 2014/0263201 or 2014/0263223, or the like or any combination thereof.

Figure 7:
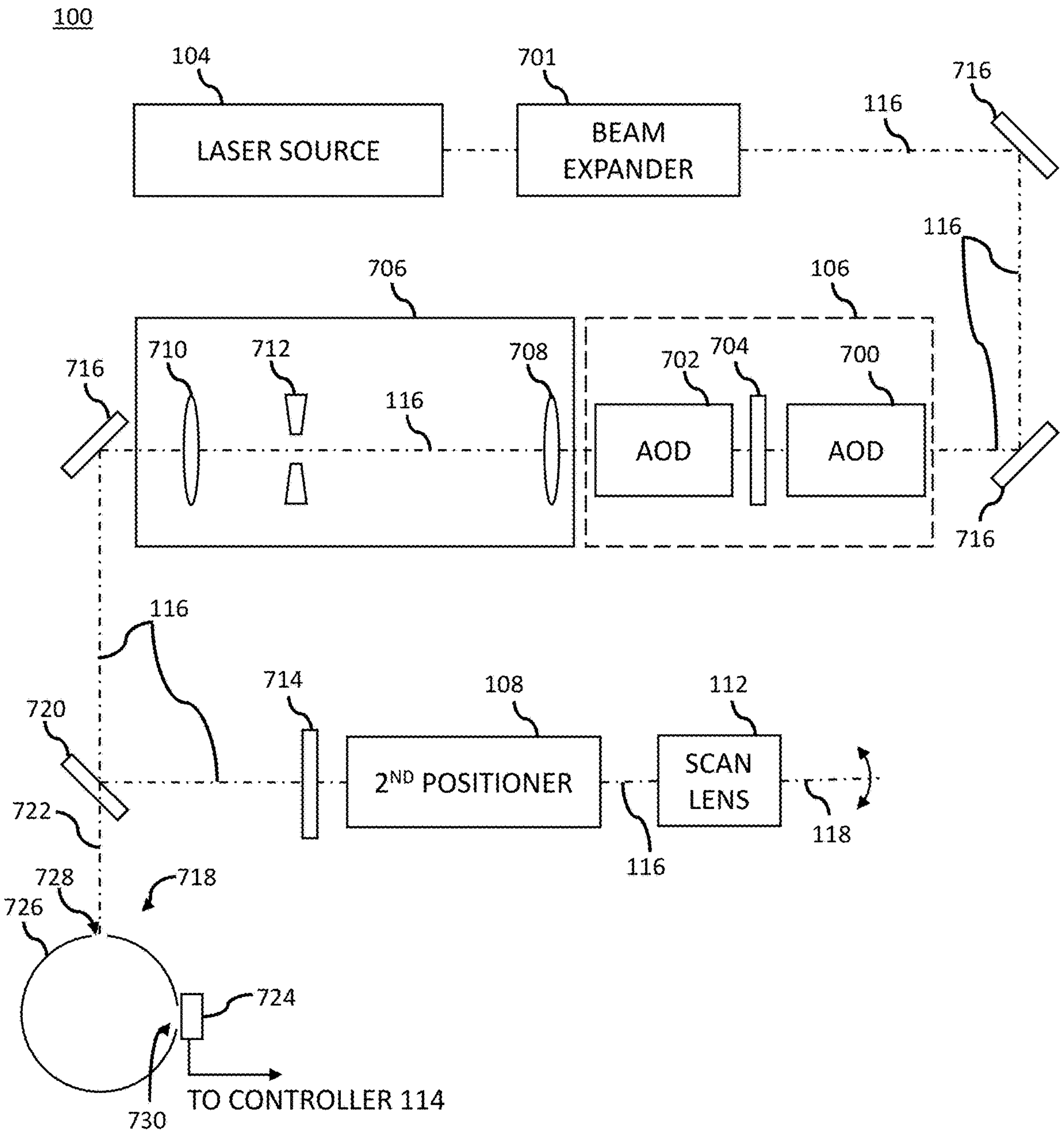
FIG. 7 schematically illustrates a laser-processing apparatus incorporating a laser sensor system according to an embodiment.

In one embodiment, and with reference to FIG. 7, the apparatus 100 includes a first positioner 106 provided as an AOD system (e.g., as discussed above) operative to deflect the beam path 116 along different axes. For example, the first positioner 106 may include a first single-axis AOD system 700 (e.g., an X-axis AOD system) and a second single-axis AOD system 702 (e.g., a Y-axis AOD system). The first positioner 106 may, optionally, include other optical components, such as a half-wave plate 704 interposed between the first single-axis AOD system 700 and the second single-axis AOD system 702. The apparatus 100 may also include a relay module 706 (e.g., including a first relay lens (or first group of lenses) 708, a second relay lens (or second group of lenses) 710, and an aperture 712 interposed therebetween). The apparatus 100 may also include a quarter-wave plate 714 arranged optically "upstream" of the second positioner 108 (e.g., provided as discussed above). The apparatus 100 may also include a plurality of mirrors 716 disposed in the beam path 116. Generally, the mirrors 716 are arranged and configured to bend of fold the beam path 116 to the various components discussed above in any desired or beneficial manner.

In the configuration described above, the laser sensor system (identified in FIG. 7 at 718) is configured to measure laser energy from a portion of the beam of laser energy sampled at a point along the beam path 116 between the first positioner 106 and the second positioner 108. Accordingly, the apparatus 100 may further include a beam splitter 720 (e.g., a partially-reflecting mirror, as illustrated, a beam splitter cube, a fiber-optic beam splitter, or the like or any combination thereof) arranged and configured to direct (e.g., reflect) a majority of the light in the beam of laser energy exiting the relay module 706 (e.g., along path 116) toward the second positioner 108 while transmitting a small amount of light (e.g., 2%, or thereabout) to propagate along path 722 to the laser sensor system 718.

Generally, the laser sensor system 718 includes a photodetector 724 configured to measure laser energy. However, the laser sensor system 718 is located optically "downstream" of the first positioner 106, and readings taken by the photodetector 724 typically vary depending upon the position or angle of the beam of energy incident thereto. Thus, movement of an incident beam of laser energy over the photodetector 724 can cause a reading error, which can result in erroneous power control, system calibrations, etc. In one embodiment, the spatial and directional sensitivity associated with the photodetector 724 can be reduced by expanding and/or diffusing the beam of laser energy propagating along path 722 (e.g., using one or more diffuser plates, a beam expander, etc.) before the beam of laser energy strikes the photodetector 724. In such a case, the spatial uniformity of the diffused/expanded beam should be larger than the range of movement of the incident beam of laser energy across the photodetector 724. In another embodiment, and with reference to FIG. 7, an integrating sphere 726 is used to reduce the spatial and directional sensitivity associated with the photodetector 724. If the integrating sphere 726 is provided, the aforementioned components (e.g., one or more diffuser plates, a beam expander, etc.) for expanding and/or diffusing the beam of laser energy propagating along path 722 prior to incidence on the photodetector 724 may be omitted (or optionally retained, if desired).

Generally, and as is known in the art, the integrating sphere 726 is an optical component that includes a hollow spherical (or at least substantially spherical) cavity, the interior surface of which is coated with a diffuse reflective coating. The integrating sphere 726 includes a collection port 728 and a detection port 730, and is arranged such that light propagating along path 722 can enter into the cavity of the integrating sphere 726 through the collection port 728. Light incident on any point on the interior surface of the cavity is scattered and, ultimately, exits the integrating sphere 726 at the detection port 730 so as to be incident upon the photodetector 724. Constructed as discussed above, it will be appreciated that the laser sensor system 718 may be considered an embodiment of the photodetector 402 discussed in connection with the beam characterization tool 128.

When the laser sensor system 718 includes the integrating sphere 726 (e.g., as shown in FIG. 7), the spatial and directional sensitivity associated with the photodetector 724 can be further reduced as compared to when the beam of laser energy propagating along path 722 is expanded and/or diffused using one or more diffuser plates, a beam expander, etc. As a result, the accuracy with which real time energy measurements from the photodetector 724 can be made is improved, thereby improving power control, calibrations, etc., using measurement data generated by the photodetector 724. Further, the photodetector 724 can also be aligned to the collection port 730 of the integrating sphere 726 very easily as compared to direct photodetector alignment to path 722. Likewise, the integrating sphere 726 can be aligned to the path 722 more easily than other mechanisms such as a diffuser plate, beam expander, etc.

K. Workpiece Handling System

Figure 8:
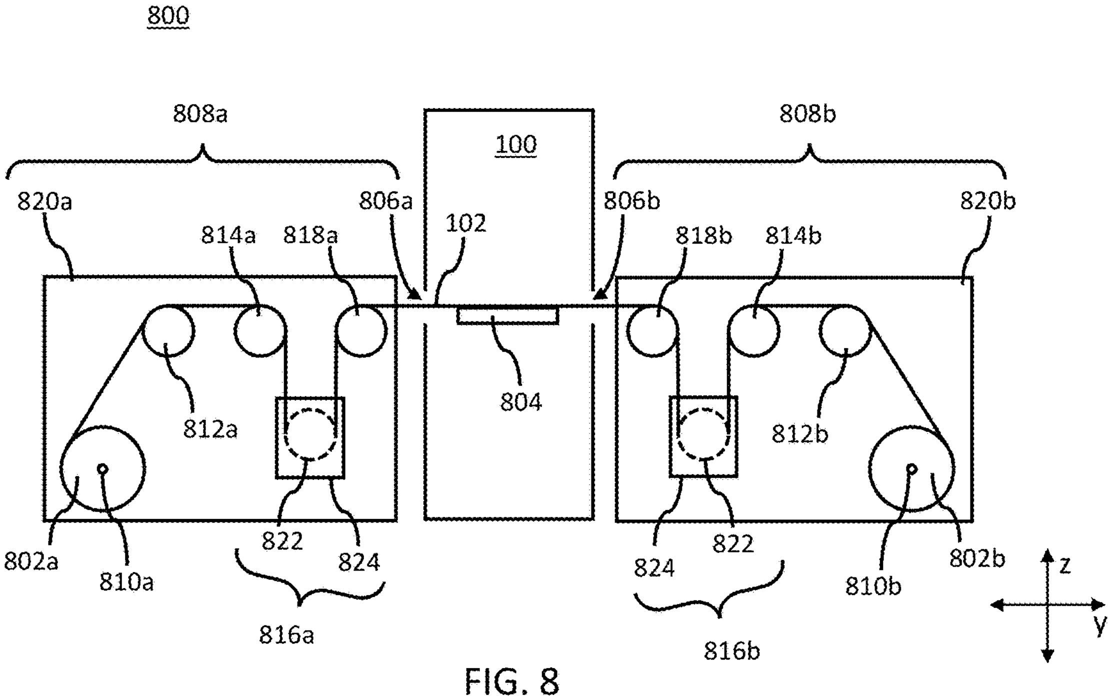
FIG. 8 schematically illustrates a workpiece handling system, according to one embodiment FIG. 9 schematically illustrates a dancer assembly of the workpiece handling system shown in FIG. 8, according to one embodiment.

Although not illustrated in FIG. 1, a workpiece handling system may be provided. Generally, the workpiece handling system can be configured to load a workpiece 102 to be processed, to unload the workpiece 102 once it has been processed, or a combination thereof. In embodiments in which the workpiece 102 is a relatively-thin, flexible object (also known as a "web," which may include fabric, paper, foil, laminate, an FPC panel, an FPC, or the like or any combination thereof), the workpiece handling system may be provided as a roll-to-roll system configured to guide the workpiece 102 (e.g., drawn from a spool or roll) to the apparatus 100 for processing and remove the processed workpiece 102 from the apparatus 100 (e.g., by loading the processed workpiece 102 onto another spool or roll). Referring to FIG. 8, a workpiece handling system configured to handle a web, such as workpiece handling system 800, may be configured to guide the workpiece 102 (e.g., drawn from an unwind material roll 802*a* formed of the workpiece 102) to the apparatus 100 (i.e., onto a fixture 804 of the apparatus 100) for processing. The workpiece handling system 800 may also be configured to remove the processed workpiece 102 from the fixture 804 onto a rewind material roll 802*b* formed of the workpiece 102.

In the illustrated embodiment, the fixture 804 is coupled to a stage of the third positioner 110 of the apparatus 100. In this case, the third positioner 110 is provided as a split-stage positioning system as discussed above, and the stage that carries the fixture 804 is a Y-stage. Accordingly, the fixture 804 is movable along the Y-direction, and one or more components such as the second positioner 108, scan lens 112, or the like or any combination thereof, is movable over the fixture 804 along the X-direction (e.g., by a linear stage which, in turn, is mounted on a frame, gantry, etc.). As mentioned above, the fixture 804 is operative to apply a force (e.g., a mechanical force, an electrostatic force, a vacuum force, a magnetic force, etc.) to the workpiece 102 to fix, hold, or otherwise secure the workpiece 102 thereto (e.g., during processing of the workpiece 102). Accordingly, the fixture 804 may be provided as a vacuum chuck, an electrostatic chuck, a magnetic chuck, etc., as is known in the art.

The workpiece handling system 800 includes an unwind assembly 808*a* operative to guide the workpiece 102 onto the fixture 804 (e.g., through a first port 806*a* of the apparatus 100) and a rewind assembly 808*b* operative to remove the processed workpiece 102 from the fixture 804 (e.g., through a second port 806*b* of the apparatus 100). The unwind assembly 808*a* includes an unwind spindle 810*a* for supporting the unwind roll 802*a*, an unwind idler roller 812*a*, a first unwind air turn 814*a*, an unwind dancer assembly 816*a*, a second unwind air turn 818*a* and an unwind support system 820*a*. Likewise, the rewind assembly 808*b* includes a rewind spindle 810*b* for supporting the rewind roll 802*b*, a rewind idler roller 812*b*, a first rewind air turn 814*b*, a rewind dancer assembly 816*b*, a second rewind air turn 818*b* and a rewind support system 820*b*. The unwind dancer assembly 816*a* and the rewind dancer assembly 816*b* (each generically referred to herein as a "dancer assembly 816") may each include a dancer roller 822 mounted to a dancer frame 824. As is known in the art, an "air turn" is a cylindrical element with either a slotted, perforated, or porous surface configured to generate a cushion of pressurized air between the workpiece 102 and the cylinder.

Although not shown, the workpiece handling system 800 may also include one or more controllers (collectively and generically referred to herein as a "handling controller") to control, or facilitate control of, the operation of the workpiece handling system 800. In one embodiment, the handling controller is communicatively coupled (e.g., over one or more wired or wireless, serial or parallel, communications links, such as USB, RS-232, Ethernet, Firewire, Wi-Fi, RFID, NFC, Bluetooth, Li-Fi, SERCOS, MARCO, EtherCAT, or the like or any combination thereof) to one or more of the aforementioned components of the workpiece handling system (e.g., any motor or actuator coupled to the unwind spindle 810*a*, the rewind spindle 810*b*, the dancer frame 824 of any dancer assembly 816, etc.), which are thus operative in response to one or more control signals outputted by the handler controller.

Generally, the handler controller includes one or more processors operative to generate the aforementioned control signals upon executing instructions. A processor can be provided as a programmable processor (e.g., including one or more general purpose computer processors, microprocessors, digital signal processors, or the like or any combination thereof) operative to execute the instructions. Instructions executable by the processor(s) may be implemented software, firmware, etc., or in any suitable form of circuitry including programmable logic devices (PLDs), field-programmable gate arrays (FPGAs), field-programmable object arrays (FPOAs), application-specific integrated circuits (ASICs)—including digital, analog and mixed analog/digital circuitry—or the like, or any combination thereof. Execution of instructions can be performed on one processor, distributed among processors, made parallel across processors within a device or across a network of devices, or the like or any combination thereof.

In one embodiment, the handler controller includes tangible media such as computer memory, which is accessible (e.g., via one or more wired or wireless communications links) by the processor. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or a combination thereof. Generally, the instructions may be stored as computer software (e.g., executable code, files, instructions, etc., library files, etc.), which can be readily authored by artisans, from the descriptions provided herein, e.g., written in C, C++, Visual Basic, Java, Python, Tel, Perl, Scheme, Ruby, assembly language, hardware description language (e.g., VHDL, VERILOG, etc.), etc. Computer software is commonly stored in one or more data structures conveyed by computer memory.

In the illustrated embodiment, the workpiece 102 is unwound from the unwind material roll 802*a* and is subsequently fed over the unwind idler roller 812*a*, over the first unwind air turn 814*a*, under the dancer roller 822 of the unwind dancer assembly 816*a* and over the second unwind air turn 818*a* before being guided through the first port 806*a* onto the fixture 804 (e.g., so that a portion of the workpiece 102 over the fixture 804 can be processed by the apparatus 100). From the fixture 804, the workpiece 102 is guided through the second port 806*b* to be fed over the second rewind air turn 818*b*, and is subsequently fed under the dancer roller 822 of the rewind dancer assembly 816*b*, then over the first rewind air turn 814*b* and over the rewind idler roller 812*b* before it is ultimately wound onto the rewind spindle 810*b* (e.g., thereby forming the rewind material roll 802*b*). Initially, the workpiece 102 is manually fed over and under the various aforementioned rollers and air turns (e.g., from the unwind spindle 810*a*, over the fixture 804 and onto the rewind spindle 810*b*, as discussed above) so as to be installed into the workpiece handling system 800.

Each of the unwind spindle 810*a* and rewind spindle 810*b* is coupled to, and driven (i.e., rotated) by one or more motors or other actuators (not shown, arranged in the first support system 818*a* and the second support system 818*b*, respectively). Thus, after initial installation, the workpicce 102 can be indexed or otherwise moved over fixture 804 rotating the unwind spindle 810*a* and rewind spindle 810*b* (each generically referred to herein as a "spindle 810") in a coordinated manner. For example, as illustrated in FIG. 8, the workpiece 102 can be moved to the right by rotating the unwind spindle 810*a* and rewind spindle 810*b* in a clockwise direction. Likewise, the workpiece 102 can be moved to the left by rotating the unwind spindle 810*a* and rewind spindle 810*b* in a counterclockwise direction.

The unwind support system 820*a* may also include a motor or other actuator coupled to the unwind spindle 810*a* so as to move the unwind spindle 810*a* along its longitudinal axis (i.e., along the X-axis, orthogonal to the illustrated Y- and Z-axes) to adjust or maintain a desired axial position of the workpiece 102 along the length of the dancer roller 822 of the unwind dancer assembly 816*a* and into the first port 806*a*. Similarly, the rewind support system 820*b* may include a motor or other actuator coupled to the rewind spindle 810*b* so as to move the dancer roller 822 of the rewind dancer assembly 816*b* along its longitudinal axis (i.e., along the X-axis) to adjust or maintain a desired axial position of the workpiece 102 exiting the second port 806*b*.

The unwind idler roller 812*a* is mounted on an axle that, in turn, is supported by the unwind support system 820*a*. Likewise, the rewind idler roller 812*b* is mounted on an axle that, in turn, is supported by the rewind support system 818*b*. The position of each axle may be adjusted (e.g., manually), but is generally fixed during operation of the material handling system 800. Unlike the unwind spindle 810*a* and rewind spindle 810*b*, the unwind idler roller 812*a* and rewind idler roller 812*b* are so-called "undriven" rollers (i.e., the idler rollers rotate on their respective axles as the workpiece 102 passes around them, as is known in the art).

The first unwind air turn 814*a* and second unwind air turn 818*a* are mounted to the first support system 820*a*. Likewise, the first rewind air turn 814*b* and second rewind air turn 818*b* are mounted to the second support system 820*b*. The position of each air turn may be adjusted (e.g., manually), but is generally fixed during operation of the material handling system 800. Unlike the idler rollers, each air turn is mounted to a respective support system so as to be rotationally fixed (e.g., such that the air turn does not rotate). During operation of the workpiece handling system 800, pressurized air (e.g., provided from a compressor or other source arranged within a support system and in fluid communication with each air turn) is fed into each air turn so as to create a cushion of air between the air turn and the workpiece 102 (e.g., so that the workpiece 102 does not contact the air turn as it passes around the air turn).

Figure 9:
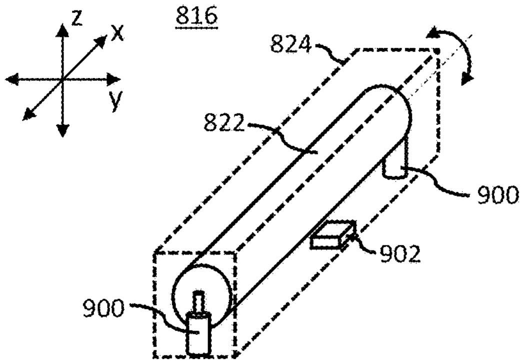

Within each of the first dancer assembly 816*a* and the second dancer assembly 816*b*, the dancer roller 822 is coupled to a respective dancer frame 824 such that the dancer roller 822 is rotatable about its longitudinal axis (e.g., rotatable about the X-axis, as shown in FIG. 9), as is known in the art. As shown in FIG. 9, each dancer assembly 816 also includes a set of biasing mechanisms 900, each of which connects an end of the dancer roller 822 to the dancer frame 824. Generally, during operation, the workpiece 102 exerts a force on the dancer roller 822 in the +Z-direction (e.g., in an upward direction, as illustrated in FIG. 9). The biasing mechanism 900 is thus configured to exert an opposing force on the dancer roller 822 in the −Z-direction (e.g., in a downward direction, as illustrated in FIG. 9). Accordingly, the biasing mechanism 900 may be provided as a pneumatic cylinder, a hydraulic cylinder, a spring-loaded single acting cylinder, or the like, or any combination thereof. In one embodiment, the biasing mechanisms 900 are configured to exert a constant (or at least substantially constant) force on the dancer roller 822.

Referring still to FIG. 9, each dancer assembly 816 also includes a distance sensor 902 (e.g., mounted to the dancer frame 824, beneath the dancer roller 822) configured to measure a distance to a portion of the workpiece 102 fed under an associated dancer roller 822 and generate sensor data representative of the distance measured. The sensor data can be output from the distance sensor 902 (e.g., as one or more sensor signals) to a controller (e.g., the handler controller) where it is used to control the manner with which the unwind spindle 810*a* and the rewind spindle 810*b* are rotated (e.g., in terms of direction, speed, amount, or the like or any combination thereof).

The dancer frame 824 of each dancer assembly 816 is coupled to and driven (i.e., translated or shifted along the Z-axis) by one or more motors or other actuators (not shown, arranged in the first support system 818*a* and the second support system 818*b*, respectively). As will be discussed in greater detail below, movement of the dancer frame 822 of each dancer assembly 816 along the Z-axis is coordinated with movement of the fixture 804 along the Y-direction.

Constructed as exemplarily described above, an operation of the workpiece handling system 800 will now be described. Prior to being processed by the apparatus 100, the workpiece 102 is installed into the workpiece handling system 800 (e.g., as discussed above). Next, the unwind spindle 810*a* and the rewind spindle 810*b* may be driven (e.g., rotated in a clockwise direction) so as to advance a portion of the workpiece 102 to be processed over the fixture 804. The portion of the workpiece 102 that is positioned over the fixture 804 is also referred to herein as a "loaded portion of the workpiece 102." As the workpiece 102 is being advanced, sensor signals output by the distance sensor 902 of one or each of the dancer assemblies 816 are used (e.g., at the handler controller) to control how the unwind spindle 810*a* and the rewind spindle 810*b* are rotated. For example, if the sensor signal indicates that the distance between the distance sensor 902 and the workpiece 102 fed under an associated dancer roller 822 (e.g., of the first dancer assembly 816*a*) is less than a predetermined threshold distance range, then the handler controller can control an operation of a motor or actuator to decrease the rate at which a spindle (e.g., the unwind spindle 810*a*) is rotated. If the sensor signal indicates that the distance between the distance sensor 902 and the workpiece 102 fed under an associated dancer roller 822 (e.g., of the first dancer assembly 816*a*) is greater than the predetermined threshold distance range, then the handler controller can control an operation of a motor or actuator to increase the rate at which a spindle (e.g., the unwind spindle 810*a*) is rotated. Upon decreasing or increasing the rate at which a spindle is rotated, the distance between the distance sensor 902 and a portion of the workpiece 102 being fed under an associated dancer roller 822 can be maintained to be within the predetermined threshold distance.

After a desired portion of the workpiece 102 is advanced over the fixture, the fixture 804 is operated (e.g., in response to a control signal output by the controller 114) to apply a force (e.g., a mechanical force, an electrostatic force, a vacuum force, a magnetic force, etc.) to the loaded portion of the workpiece 102 to fix, hold, or otherwise secure the loaded portion of the workpiece 102 thereto. During processing of the loaded portion of the workpiece 102 by the apparatus 100, the fixture 804 can be moved back and forth along the Y-axis (e.g., due to movement of the Y-stage of the apparatus 100). Once secured to the fixture 804, the loaded portion of the workpiece 102 can likewise be moved along the Y-axis. Generally, movement of the Y-stage supporting the fixture 804 (and, thus, movement of the workpiece 102) along the Y-axis can be characterized by an acceleration that is significantly greater than the angular acceleration of a spindle 810.

To eliminate or otherwise reduce flutter, wrinkles, or breaks in the workpiece 102 caused by differences in acceleration capabilities between the Y-stage supporting the fixture 804 and the spindles 810, the dancer assemblies 816 are driven so as to be raised or lowered (e.g., along the Z-axis) in a coordinated manner with movement of the fixture 804 along the Y-axis. For example, if the Y-stage supporting the fixture 804 moves to the left along the Y-axis at a velocity, "v," across a distance "d," then the first dancer assembly 816*a* moves downward along the Z-axis at half the velocity and distance (i.e., at a velocity v/2, across a distance d/2) while the second dancer assembly 816*b* moves upward along the Z-axis at half the velocity and distance (i.e., at a velocity v/2, across a distance d/2). Likewise, if the Y-stage supporting the fixture 804 moves to the right along the Y-axis at a velocity, "v," across a distance "d," then the first dancer assembly 816*a* moves upward along the Z-axis at half the velocity and distance (i.e., at a velocity v/2, across a distance d/2) while the second dancer assembly 816*b* moves downward along the Z-axis at half the velocity and distance (i.e., at a velocity v/2, across a distance d/2). Generally, the dancer assemblies 816 are driven at an acceleration that is closely matched to the acceleration at which the Y-stage is driven. By raising and lowering the dancer assemblies 816 as described above, a portion of the workpiece 102 between the unwind material roll 802*a* and the first unwind air turn 814*a* (as well as a portion of the workpiece 102 between the rewind material roll 802*b* and the first rewind air turn 814*b*) can remain stationary (or at least substantially stationary) even when the loaded portion of the workpiece 102 is moved along the Y-axis by the fixture 804.

To facilitate coordinated movement of the dancer assemblies 816 and the Y-stage supporting the fixture 804, the apparatus 100 may include an encoder (not shown) operatively coupled to the Y-stage and configured to generate an encoder signal representing data (also referred to herein as "encoder data") such as the position of the Y-stage, direction in which the Y-stage is traveling, velocity at which the Y-stage is traveling, or the like or any combination thereof, as is known in the art. The encoder may be communicatively coupled (e.g., over one or more wired or wireless, serial or parallel, communications links) to the handler controller and thus be capable of transmitting encoder data direction to the handler controller. Alternatively, the encoder may be communicatively coupled (e.g., over one or more wired or wireless, serial or parallel, communications links) to the controller 114 which, in turn, is communicatively coupled to the handler controller. In this alternative embodiment, the handler controller may receive encoder data from the controller 114 which, in turn, received the encoder data from the encoder. Upon receiving the encoder data, the handler controller generates and outputs one or more control signals to move the dancer assemblies 816 as discussed above.

There will inevitably be a delay between the time when encoder signal is output by the encoder and the time when the dancer assemblies 816 are raised or lowered in response to the Y-stage movement. Typically, the delay is on the order of a few milliseconds. The biasing mechanisms 900 of each dancer assembly 816, which are constantly exerting a force on the dancer rollers 822, thus act to account for the delay to maintain the workpiece 102 in a desired state of tension until the dancer assemblies 816 are raised or lowered in response to the Y-stage movement.

Figure 10:
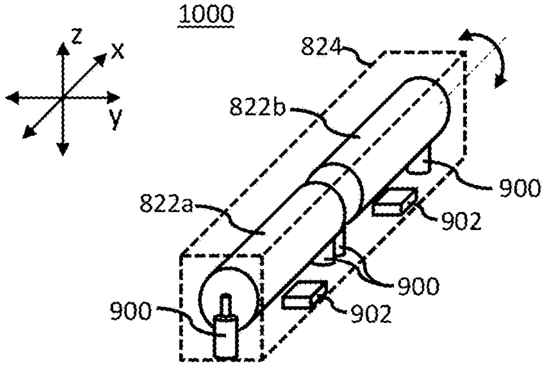
FIG. 10 schematically illustrates a dancer assembly according to another embodiment.

Constructed as exemplarily discussed above, the workpiece handling system 800 is adapted to handle a single workpiece 102 (e.g., to guide the workpiece 102 to, and remove the workpiece 102 from, the apparatus 100). In other embodiments, however, a workpiece handling system can be configured to handle multiple workpieces. For example, the workpiece handling system 800 can be modified to handle two workpieces. To enable handling of two workpieces, each of the dancer assemblies 816 can be replaced by a dancer assembly, such as dancer assembly 1000 shown in FIG. 10. Referring to FIG. 10, the dancer assembly 1000 includes two dancer rollers (i.e., a first dancer roller 822*a* and a second dancer roller 822*b*, each generically referred to as a "dancer roller 822"), each mounted to a dancer frame 824 in the same manner as discussed above with respect to FIGS. 8 and 9 (e.g., by a set of biasing mechanisms 900). The dancer assembly 1000 may also include a distance sensor 902 arranged and configured to measure a distance to a portion of a workpiece fed under an associated dancer roller 822 (e.g., in the same manner as discussed above with respect to FIG. 9).

Figure 11:
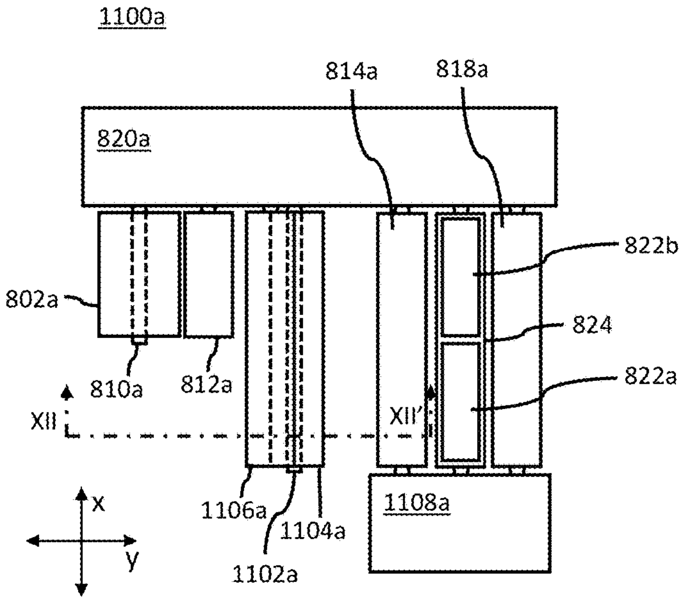
FIG. 11 schematically illustrates an unwind assembly of a workpiece handling system according to another embodiment.
Figure 12:
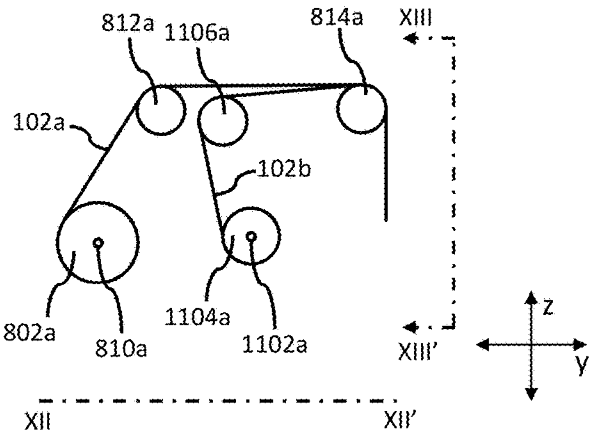
FIGS. 12 and 13 schematically illustrate various plan views taken along lines XII-XII' and XIII-XIII, respectively, as shown in FIGS. 11 and 12, respectively.

Further, to enable handling of two workpieces, each of the unwind assembly 808*a* and rewind assembly 808*b* can be modified to include two spindles and two idler rollers. For example, and with reference to FIGS. 11 and 12, the unwind assembly 808*a* can be modified to yield unwind assembly 1100*a*. As shown, the unwind assembly 1100*a* includes an unwind spindle 1102*a* for supporting an additional unwind roller 1104*a*, and an unwind idler roller 1106*a*, in addition to the aforementioned components of the unwind assembly 808*a*. As similarly discussed above with respect to FIG. 8, the unwind support system 820*a* may include one or more motors or other actuators to move the unwind spindle 1102*a* in the manner described with respect to the unwind spindle 810*a*, independently of the unwind spindle 810*a*. Although not illustrated, the rewind assembly 808*b* can be modified in a similar manner as discussed above with respect to FIGS. 11 and 12 so as to include an additional rewind spindle and an additional rewind idler roller.

Figure 13:
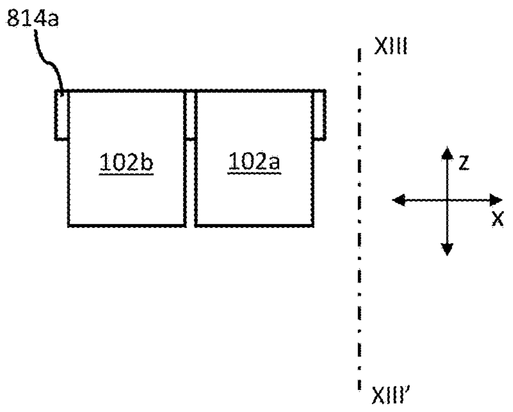

Referring to FIGS. 12 and 13, the workpiece handling system 800—modified as discussed above with respect to FIGS. 10 to 12—can thus handle two workpieces (e.g., a first workpiece 102*a* and a second workpiece 102*b*, each generically referred to as a "workpiece 102"). Constructed as described above, within the modified unwind assembly 1100, the first workpiece 102*a* and the second workpiece 102*b* are fed over different idler rollers and beneath different dancer rollers of the same dancer assembly, but the first workpiece 102*a* and the second workpiece 102*b* are each fed over common air turns. The first workpiece 102*a* and the second workpiece 102*b* are likewise fed over and under the various components of the rewind assembly 808*b*, modified as described above. Depending upon the diameter of the material rolls of the first workpiece 102*a* and the second workpiece 102*b*, the first workpiece 102*a* may move at a different speed than the second workpiece 102*b* between an associated spindle and idler roller. Likewise, depending upon a difference in tension in the first workpiece 102*a* and the second workpiece 102*b* around the first dancer roller 822*a* and the second dancer roller 822*b*, within a common dancer assembly 1000, the first dancer roller 822*a* may be raised or lowered differently from the second dancer roller 822*b*.

III. Embodiments Concerning Measurement Data

Measurement data that has been generated (e.g., as discussed above) can be processed (e.g., in an automated manner at the controller 114, at the remote system 126, or the like or any combination thereof) to estimate, derive, discern or otherwise obtain one or more spatial characteristics of the beam of laser energy, one or more energy characteristics of the beam of laser energy, or the like or any combination thereof.

Examples of spatial characteristics, which can be measured, can include spatial energy distribution, spatial phase distribution, spatial polarization distribution, spot size, spot size, spot shape, spot shape, spot orientation, spot centroid, spot quality (e.g., as represented by the $M^2$ parameter, as is known in the art), or the like or any combination thereof. Spot shape may be measured, calculated, estimated or otherwise determined using any known or suitable technique (e.g., such as any known technique for calculating circularity, roundness, etc.). For example, circularity may be determined according to the following formula:

$$C = \frac{4\pi A}{P^2}$$

where C is the circularity of the spot illuminated by the beam of laser energy, A is the area of the spot, and P is the perimeter of the area of the spot.

Examples of energy characteristics can include spot fluence, pulse energy (i.e., when the beam of laser energy includes one or more pulses of laser energy), average power, peak power, or the like or any combination thereof. In some embodiments, data representing one or more of the aforementioned characteristics such as pulse energy (i.e., when the beam of laser energy includes one or more pulses of laser energy), average power, peak power, etc., or the like or any combination thereof, may be used to facilitate determination of an energy characteristic such as spot fluence. Data representing one or more other characteristics such as pulse duration or pulse repetition frequency (i.e., when the beam of laser energy includes one or more pulses of laser energy), etc., may also be used to facilitate determination of one or more energy characteristics. If not generated as measurement data, such data may be input to the controller 114 (e.g., via the user interface 120, the communications module 122, etc.), or otherwise be accessible to, the controller 114, the remote system 126, or the like or any combination thereof.

Measurement data can be generated periodically, continuously (e.g., over a period of time), or before or after an event occurs, or any combination thereof. Examples of events that can trigger generation of measurement data include initiation of the processing of a workpiece 102, completion of the processing one or more workpieces 102, operation of the apparatus 100 for a predetermined amount of time, operation of the laser source 104 for a predetermined amount of time, or the like or any combination thereof. Another example of an event that can trigger generation of measurement data can include the receipt of an instruction to measure one or more beam characteristics (e.g., input via the user interface 120, the remote system 126, or the like or any combination thereof).

Generally, any spatial characteristic of the beam of laser energy can be obtained (e.g., as discussed above) upon generating measurement data. Once obtained, data representing one or more spatial or energy characteristics (generically referred to herein as "spot data") can be interpreted, manipulated, inputted to an algorithm or otherwise processed (e.g., in an automated manner at the controller 114, the remote system 126, or the like or any combination thereof) to support one or more operations. Example embodiments of such operations are described in greater detail in the sections below entitled "Adaptive Processing," "Process Control," and "Notifications."

A. Adaptive Processing

Spot data representing a spatial characteristic obtained from measurement data can be processed to determine whether it is outside an associated threshold processing tolerance. In one embodiment, determining whether a particular spatial characteristic obtained from measurement data is outside an associated threshold processing tolerance can involve comparing a value of the particular spatial characteristic (i.e., a "measured value") to a reference value for the particular spatial characteristic. As used herein, the term "tolerance" refers to an acceptable amount of variation of a reference value for a particular spatial characteristic.

In one embodiment, a particular spatial characteristic is outside an associated threshold processing tolerance if the measured value is greater or less than a reference value for the particular spatial characteristic. In another embodiment, the measured value of a particular spatial characteristic is outside the threshold processing tolerance for the particular spatial characteristic if it is greater than (or less than) the reference value by a threshold amount. Upon determining that a spatial characteristic is outside a threshold processing tolerance, an operation of one or more components of the apparatus 100 may be controlled (e.g., in an automated manner by the controller 114, the remote system 126, or the like or any combination thereof) to adjust one or more characteristics of the beam of laser energy, to adjust a process trajectory, or the like or any combination thereof. Example embodiments of such responses are described in greater detail below.

The reference value (or threshold amount) can be arbitrary, or can correspond to a value (or range of values) of a particular spatial characteristic used when a process was developed, when a process was considered to yield acceptable throughput, when a process was considered to yield acceptable quality, or the like or any combination thereof. In one embodiment, the threshold amount can be set manually (e.g., by the manufacturer of the apparatus 100, by a user or other operator of the apparatus 100, by an applications engineer or technician responsible for developing a process or recipe for processing the workpiece 102, or the like or any combination thereof) via the user interface 120, the remote system 126, or the like or any combination thereof. In another embodiment, the threshold amount can be derived (e.g., at the controller 114, at the remote system 126, or the like or any combination thereof) based (at least in part) on the amount of time the laser source 104 has been operating, on the amount of time the apparatus 100 has been operating, on the amount of time that has passed since the scan lens 112 (or any other optical component of the apparatus 100) has been cleaned or replaced, or the like or any combination thereof.

i. Correction of Spatial Characteristics

Upon determining that a measured value of a spatial characteristic is outside a threshold processing tolerance for the particular spatial characteristic, one or more control signals can be generated and output (e.g., from the controller 114, the remote system 126, or the like or any combination thereof) to at least one selected from the group consisting of the first positioner 106, second positioner 108, third positioner 110, lens actuator, scan lens 112 (when provided as a variable-focal length lens), VOA, beam size adjustment mechanism, beam shape adjustment mechanism, etc., to adjust an operation of one or more of these components in a manner that brings the spatial characteristic back into tolerance. Bringing an out-of-tolerance spatial characteristic back into tolerance is herein referred to as "correcting" the out-of-tolerance spatial characteristic.

For example, if it is determined that the spot size is larger than a reference spot size (or larger than the reference spot size by a threshold amount), then one or more control signals can be generated and output (e.g., from the controller 114, the remote system 126, or the like or any combination thereof) to at least one selected from the group consisting of the first positioner 106, the second positioner 108, the third positioner 110, the lens actuator, the scan lens 112 (when provided as a variable-focal length lens), the beam size adjustment mechanism, etc., to adjust an operation of one or more of these components in a manner that reduces the spot size to be equal to the reference spot size (or that reduces the spot size to be larger than the reference spot size by less than the threshold amount), thus bringing the measured spot size back into tolerance.

In another example, if it is determined that the spot shape has a circularity that is less than a reference circularity (or less than the reference spot size by a threshold amount), then one or more control signals can be generated and output (e.g., from the controller 114, the remote system 126, or the like or any combination thereof) to at least one selected from the group consisting of the first positioner 106, the second positioner 108, the third positioner 110, the lens actuator, the scan lens 112 (when provided as a variable-focal length lens), the beam size adjustment mechanism, the beam shape adjustment mechanism, etc., to adjust an operation of one or more of these components in a manner that increases the circularity of the spot shape to be equal to the reference circularity (or that increases the circularity to be smaller than the reference circularity by less than the threshold amount), thus bringing the measured circularity back into tolerance.

ii. Compensation of Spatial Characteristics

Upon determining that a value of a spatial characteristic is outside a threshold processing tolerance for the particular spatial characteristic, another determination may be made (e.g., at the controller 114, the remote system 126, or the like or any combination thereof) as to whether a value of a corresponding energy characteristic is outside a threshold processing tolerance for the energy characteristic. Upon determining that the value of the energy characteristic is outside the threshold processing tolerance for the energy characteristic, one or more control signals can be generated and output (e.g., from the controller 114, the remote system 126, or the like or any combination thereof) to at least one selected from the group consisting of the laser source 104, first positioner 106, second positioner 108, third positioner 110, lens actuator, the scan lens 112 (when provided as a variable-focal length lens), VOA, beam size adjustment mechanism, beam shape adjustment mechanism, etc., to adjust an operation of one or more of these components in a manner that brings the value of the energy characteristic back into tolerance. Bringing an out-of-tolerance energy characteristic back into tolerance is herein referred to as "compensating" for the out-of-tolerance spatial characteristic. In this case, the spatial characteristic is not necessarily "corrected" as discussed above, but the operation of one or more of the aforementioned components may optionally be controlled to reduce the degree to which the spatial characteristic is outside of its respective threshold processing tolerance.

For example, if it is determined that the spot size is larger than a reference spot size (or larger than the reference spot size by a threshold amount) resulting in a fluence value at the spot that is smaller than a reference fluence value, then one or more control signals can be generated and output (e.g., from the controller 114, the remote system 126, or the like or any combination thereof) to at least one selected from the group consisting of the laser source 104, first positioner 106, second positioner 108, VOA, etc., to increase the power or energy content of the beam of laser energy delivered to the workpiece 102. In one implementation, the operation of the laser source 104 can be controlled to increase the power or energy content of the beam of laser energy output therefrom, thus bringing the fluence back into tolerance. Operation of the laser source 104 can be controlled by adjusting an electrical current applied to the laser source 104 (e.g., to a pump laser diode of the laser source 104), by adjusting an RF signal driving the laser source 104, or the like or any combination thereof. In another implementation, the operation of one or more of the first positioner 106 or second positioner 108 (e.g., when either of the positioners includes an AOD system) or the VOA, or the like or any combination thereof, can be controlled to reduce the degree to which these components attenuate the beam of laser energy transmitted therethrough, thus bringing the fluence back into tolerance. Optionally, one or more control signals can be generated and output (e.g., from the controller 114, the remote system 126, or the like or any combination thereof) to at least one selected from the group consisting of the first positioner 106, second positioner 108, third positioner 110, lens actuator, scan lens 112 (when provided as a variable-focal length lens), beam size adjustment mechanism, etc., to reduce the degree to which the spot size is larger than the reference spot size.

iii. Trajectory Adjustment

Upon determining that a value of a spatial characteristic (e.g., spot size, spot shape, etc.) is outside a threshold processing tolerance for the particular spatial characteristic, a determination can be made (e.g., at the controller 114, the remote system 126, or the like or any combination thereof) as to whether a spot having the value of the spatial characteristic, if scanned along a predetermined trajectory, would result in the formation of a feature having a shape and/or size that deviates from a desired size and/or shape. Upon determining that a feature having a size and/or shape deviating from a desired size and/or shape will be formed, one or more control signals can be generated and output (e.g., from the controller 114, the remote system 126, or the like or any combination thereof) to at least one selected from the group consisting of the first positioner 106, second positioner 108 and third positioner 110 to control an operation of one or more of these components in a manner that adjusts the predetermined trajectory such that the feature ultimately formed has the desired size and/or shape.

For example (and assuming that a desired trajectory defines a circular via of a desired diameter), if a spot size is smaller than a reference spot size (or is smaller than the reference spot size by a threshold amount), then scanning the spot along a predetermined trajectory may result in formation of a circular via having a diameter that is smaller the desired diameter. Upon determining that the spot size will result in the formation of a circular via having a diameter that is smaller than a desired diameter, one or more control signals can be generated and output (e.g., from the controller 114, the remote system 126, or the like or any combination thereof) to at least one selected from the group consisting of the first positioner 106, second positioner 108 and third positioner 110 to control an operation of one or more of these components in a manner that adjusts the predetermined trajectory such that the circular via ultimately formed has the desired diameter.

In another example (and still assuming that a desired trajectory defines a circular via of a desired diameter), if a spot shape has a circularity that is smaller than a reference spot circularity (or is smaller than the reference spot circularity by a threshold amount), then scanning the spot along a predetermined trajectory will result in formation of an elliptical via. Upon determining that the spot shape will result in the formation of a via having an elliptical shape instead of a via having a circular shape, one or more control signals can be generated and output (e.g., from the controller 114, the remote system 126, or the like or any combination thereof) to at least one selected from the group consisting of the first positioner 106, second positioner 108 and third positioner 110 to control an operation of one or more of these components in a manner that adjusts the predetermined trajectory such that the via ultimately formed has the desired circularity.

B. Process Control

Measurement data, spot data, or any other data (e.g., data representing pulse duration or pulse repetition frequency, when the beam of laser energy includes one or more pulses of laser energy), data generated or otherwise obtained upon performing a visual inspection operation, or the like or any combination thereof, may be stored. In one embodiment, such data may be stored (e.g., in a database) in association with auxiliary information representing the identity of the apparatus 100 (e.g., in terms of serial number, model number, etc.), the identity of the workpiece 102 (e.g., in terms of batch or lot number, serial number, model number, etc.) that is to be (or has been) processed by the apparatus 100, the date and/or time the data was generated or otherwise obtained, or the like or any combination thereof. This stored data and information is generically referred to as "process control data." The database may be reside locally (e.g., on a computer memory of, or otherwise accessible to, the controller 114), be located remote from the apparatus 100 (e.g., on a computer memory of, or otherwise accessible to, the remote system 126), or the like or any combination thereof. Process control data may also include data obtained from, or otherwise generated by, one or more downstream test or inspection systems (e.g., an automated optical inspection (AOI) system, an automated X-ray inspection (AXI) system, an in-circuit test (ICT) system, a wafer probe system, etc.) that tested or inspected the workpiece 102 subsequent to processing by the apparatus 100.

Once stored, the process control data can later be interpreted, manipulated, inputted to an algorithm or otherwise processed (e.g., at the controller 114, at the remote system 126, or the like or any combination thereof) to support one or more operations. For example, the process control data can be processed to execute one or more known statistical process control (SPC) methods (e.g., to understand limits associated with processes performed by the apparatus 100, to understand limits associated with any specification of the workpiece 102 or any feature to be formed in the workpiece 102, etc.), to identify and/or eliminate sources of process variability, to monitor production processes, to detect changes in process variability, to estimate whether corrective maintenance or preventative maintenance is required, to estimate when (e.g., in terms of time and/or date) when to perform preventative maintenance, or the like or any combination thereof. As used herein, "maintenance" can include one or more activities such as tests, measurements, parts replacement, cleaning, and the like. It will be appreciated that such SPC methods may be facilitated by processing the process control data to generate one or more process control charts. The process control data can also be accessed (e.g., via the user interface 120, via the remote system 126, or the like or any combination thereof) for any other suitable or desired purpose.

Any SPC method can be executed periodically, continuously (e.g., over a period of time), or before or after an event occurs, or any combination thereof. Examples of events that can trigger execution of any SPC method include initiation of the processing of a workpiece 102, completion of the processing one or more workpieces 102, operation of the apparatus 100 for a predetermined amount of time, operation of the laser source 104 for a predetermined amount of time, or the like or any combination thereof. Another example of an event that can trigger execution of any SPC method can include the receipt of an instruction to measure one or more beam characteristics (e.g., input via the user interface 120, the remote system 126, or the like or any combination thereof).

In one embodiment, a first SPC method can be executed (e.g., at the controller 114, at the remote system 126, or the like or any combination thereof) to determine, by any technique known in the art, whether the process control data indicate that processing of the workpiece 102 has yielded one or more features with degraded quality. Optionally, if the first SPC method indicates that processing of the workpiece 102 yielded one or more features with degraded quality, then a second SPC method can be executed (e.g., at the controller 114, at the remote system 126, or the like or any combination thereof) to determine, by any technique known in the art, whether any spatial or energy characteristics show aberrant data or movement from historical trends. In one embodiment, the first SPC method can generate data indicating that corrective or preventative maintenance is required if processing of the workpiece 102 yielded one or more features with degraded quality. Alternatively, in another embodiment, data indicating that corrective or preventative maintenance is required may be generated only if the second SPC method determines that a spatial or energy characteristic shows aberrant data or movement from historical trends.

In one embodiment, spot data and other process control data can be interpreted, manipulated, inputted to an algorithm (e.g., a machine learning algorithm) or otherwise processed (e.g., at the controller 114, the remote system 126, or the like or any combination thereof) in any desired or otherwise suitable manner known in the art to determine a value of one or more spatial or energy characteristics that would result in unacceptable feature quality for a given process, to identify trends in relevant spatial or energy characteristics to determine when preventative maintenance should be performed to avoid unacceptable feature quality, or the like or any combination thereof.

a first SPC method can be executed (e.g., at the controller 114, at the remote system 126, or the like or any combination thereof) to determine, by any technique known in the art, whether the process control data indicate that processing of the workpiece 102 has yielded one or more features with degraded quality. Optionally, if the first SPC method indicates that processing of the workpiece 102 yielded one or more features with degraded quality, then a second SPC method can be executed (e.g., at the controller 114, at the remote system 126, or the like or any combination thereof) to determine, by any technique known in the art, whether any spatial or energy characteristics show aberrant data or movement from historical trends. In one embodiment, the first SPC method can generate data indicating that corrective or preventative maintenance is required if processing of the workpiece 102 yielded one or more features with degraded quality. Alternatively, in another embodiment, data indicating that corrective or preventative maintenance is required may be generated only if the second SPC method determines that a spatial or energy characteristic shows aberrant data or movement from historical trends.

C. Notifications

Upon determining that any spatial or energy characteristic of the beam of laser energy is outside a threshold processing tolerance, notification data may be generated (e.g., in an automated manner at the controller 114, the remote system 126, or the like or any combination thereof). Notification data may indicate that the characteristic is out-of-tolerance, indicate the measured value of the out-of-tolerance characteristic, indicate the date and/or time that the characteristic was determined to be out-of-tolerance, identify the apparatus 100 with the out-of-tolerance characteristic (e.g., by serial number, model number, etc.), or the like or any combination thereof. In one embodiment, the notification data can indicate (e.g., based on results of executing one or more SPC methods, as discussed above) that corrective maintenance or preventative maintenance on the apparatus 100 should be performed. In embodiments in which the notification data indicates that maintenance should be performed, automated control of the apparatus 100 can be performed (e.g., in any manner as discussed above in the section entitled "Adaptive Processing"), or the automated control of the apparatus 100 can be omitted.

Once generated, notification data can be rendered or otherwise conveyed (e.g., visually, audibly, etc.) in a user-friendly manner via an output device associated with the user interface 120, the remote system 126, or the like or any combination thereof, in any manner known in the art. In embodiments where the notification data rendered or otherwise conveyed through the remote system 126, the notification data can be delivered to the user via text, email, push notification, in-app message, or the like or any combination thereof.

In another embodiment, the controller 114 and/or the remote system 126 generates the notification data upon obtaining any spatial or energy characteristic of the beam of laser energy, regardless of whether any of such characteristics are out-of-tolerance. In this case, the notification data does not necessarily indicate that the characteristic is out-of-tolerance.

D. Other Embodiments, Considerations, Implications, etc

It is possible that spot quality and size can vary among different laser-processing apparatuses 100, and can also vary over time (e.g., from the time the apparatus 100 is installed to the time of process development to the time that high-volume processing of workpieces 102 is performed). The implication of those changes is that a set of process parameters that was developed on a first apparatus 100 at time T1 may have one or more first spatial or energy characteristics C1, but customers will want to use the same process parameters on a second apparatus 100, a third apparatus 100, etc. (all of which include the same components as the first apparatus 100), etc., as well as on the first apparatus 100 at time T2. The first, second, third and fourth apparatuses 100 at time T2 will have one or more second spatial or energy characteristics C2, one or more third spatial or energy characteristics C3, one or more fourth spatial or energy characteristics C4, and one or more fifth spatial or energy characteristics C5, respectively. Thus, unless a process was developed to be robust to these variations in spatial or energy characteristics, there will be a reduction in process yield. The embodiments discussed above compensate for the variations in spatial or energy characteristics that may arise to maintain desirable throughput and process yield.

It is also possible that spot quality and size can vary over time, temperature, due to optical contamination, and other extrinsic factors. The implication of those changes is that a set of process parameters that resulted in a given process quality on a given material with a given apparatus 100 at time T1 and one or more spatial or energy characteristics C1 may result in a different or inadequate quality on that same material and the same apparatus 100 at a subsequent time T2 and one or more spatial or energy characteristics C2 (different from C1). The embodiments discussed above account for these variations by providing techniques facilitating corrective and preventive maintenance to be performed.

V. Embodiments Concerning Scanning Techniques

As used herein, the term "scanning technique" can refer to the manner in which a process spot is scanned (e.g., within the first scanning range, the second scanning range, the third scanning range, or the like or any combination thereof) relative to the workpiece 102, the manner in which the first scanning range is scanned within the second scanning range, the manner in which any of the first or second scanning ranges is scanned within the third scanning range, or the like or any combination thereof. Generally, a scanning technique can be characterized by one or more parameters such as the process trajectory along which a process spot is to be scanned, direction (i.e., direction along which the process spot, first scanning range, second scanning range, or the like or any combination thereof, is to be scanned), scan rate (i.e., speed with which the process spot, first scanning range, second scanning range, or the like or any combination thereof, is to be scanned), or the like or any combination thereof.

A. Embodiments Concerning Resonant Scanning

Figure 14:
FIG. 14 schematically illustrates an arrangement of process spots irradiated by laser pulses delivered to a workpiece at a constant pulse repetition rate, after the laser pulses have been deflected by a resonant scanning mirror system.

As mentioned above, the position of the process spot of a beam of laser energy deflected by a resonant scanning mirror system varies sinusoidally as a function of time. Thus, if the laser source 104 outputs a beam of laser energy consisting of a series of laser pulses at a constant (or substantially constant) pulse repetition frequency, then the resonant scanning mirror system will deflect the series of laser pulses such that laser pulses are delivered to the workpiece 102 at a plurality of process spots that are not uniformly distributed along an axis (e.g., when performing a process such as cutting, perforating, welding, scribing, marking, photoresist exposure, etc.). See, e.g., FIG. 14, which illustrates a non-uniform arrangement of process spots 1400, obtained upon deflecting a beam of laser pulses along an arbitrary axis using a resonant scanning mirror system. This can make it difficult to distribute laser energy to the workpiece 102 in a uniform or otherwise desired manner.

In one embodiment, the sinusoidal scanning can be compensated for by controlling an operation of the laser source 104 to vary the pulse repetition frequency of laser pulses in the output beam of laser energy (e.g., such that the variation in pulse repetition frequency is in phase with the sinusoidal oscillation of the resonant scanning mirror system).

Figure 15:
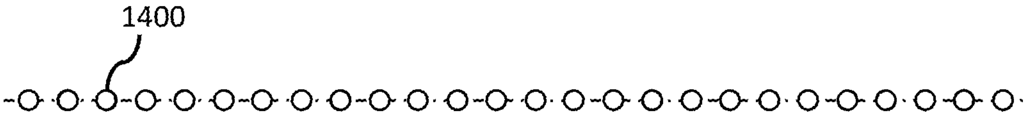
FIG. 15 schematically illustrates an arrangement of process spots irradiated by laser pulses delivered to a workpiece at a constant pulse repetition rate, after the laser pulses have been deflected by a resonant scanning mirror system and another positioner configured to compensate for the sinusoidal oscillation of the resonant scanning mirror system, according to one embodiment.

In another embodiment, the sinusoidal scanning can be compensated for by providing a first positioner 106 that includes an AOD system (e.g., any AOD system as discussed above), and by providing the second positioner 108 as the resonant scanning mirror system. In this embodiment, the resonant scanning mirror system of the second positioner 108 is arranged and configured so as to impart movement of the beam axis 118 along a first axis and the first positioner 106 includes a first AOD system arranged and configured to impart movement of the beam axis 118 along the first axis. The first AOD system may then be driven (e.g., upon the application of one or more RF signals to one or more ultrasonic transducer elements, each acoustically coupled to an AO cell) in a manner that compensates for changes in acceleration of the oscillating mirror in the resonant scanning mirror system during operation of the second positioner 108 (e.g., such that laser pulses are delivered to the workpiece 102 at a plurality of process spots at least substantially uniformly distributed along an axis). See, e.g., FIG. 15, which illustrates a uniform (or at least substantially uniform) arrangement of process spots 1400, obtained upon deflecting a beam of laser pulses along an arbitrary axis using the first AOD system of the first positioner 106 and the resonant scanning mirror system of the second positioner 108. It will be appreciated that the first AOD system may be driven in any other suitable or desired manner, and does not necessarily have to be driven to compensate for changes in acceleration of the oscillating mirror in the resonant scanning mirror system. Optionally, the first positioner 106 can include a second AOD system arranged and configured to impart movement of the beam axis 118 along a second axis that is different from the first axis. In this case, the first axis may be one of the X-axis, and the second axis may be the Y-axis.

B. Facilitating Feature Formation

Generally, the first positioner 106 can be operated to scan the process spot along the X-direction (e.g., in the +X or −X direction) and/or along the Y-direction (e.g., in the +Y or −Y direction) while the second positioner 108 scans the first scanning range along the X-direction (e.g., in the +X or −X direction), while the second positioner 108 scans the first scanning range along the Y-direction (e.g., in the +Y or −Y direction), while the third positioner 110 scans the first and/or second scanning ranges along the X-direction (e.g., in the +X or −X direction), while the third positioner 110 scans the first and/or second scanning ranges along the Y-direction (e.g., in the +Y or −Y direction), or any combination thereof. Nevertheless, it should be recognized that the first positioner 106 can be operated to scan the process spot along the X-direction (e.g., in the +X or −X direction) and/or along the Y-direction (e.g., in the +Y or −Y direction) when the second positioner 108 is not scanning the first scanning range, when the third positioner 110 is not scanning the first or second scanning ranges, or any combination thereof. It should also be recognized that, at any point in time, the direction along which (or in which) the process spot is scanned by the first positioner 106 can the same as, or different from, the direction along which (or in which) the first scanning range is scanned within the second scanning range by the second positioner 108, the direction along which (or in which) the first scanning range is scanned within the third scanning range by the third positioner 110, or any combination thereof.

In some embodiments, the workpiece 102 is provided as a PCB panel, a PCB, an FPC panel, an FPC, an IC, an ICP, a semiconductor device, etc. Thus, the workpiece 102 may include one or more constituent structures such as an electrical conductor structure (e.g., such as a film, foil, etc., which may be formed of copper, a copper alloy, an interconnect or wiring structure comprising one or more metals such as copper, titanium, titanium nitride, tantalum, etc., or the like or any combination thereof), a dielectric structure (e.g., a build-up film, a glass-reinforced epoxy laminate, an interlayer dielectric material, a low-k dielectric material, solder resist, or the like or any combination thereof. In some embodiments, the workpiece 102 may include a dielectric structure (e.g., a glass-reinforced epoxy laminate, a film formed of a polymer such as polyimide, polyester, PEN, PET, solder resist, etc.) adhered to a first conductor (e.g., a copper or copper alloy foil, which may have an exposed surface that is either darkened—e.g., by a chemical reaction, by a laser-darkening process, etc.—or that is not darkened) at a first side thereof and, optionally, to a second conductor (e.g., a pad, a trace, foil, etc., formed of copper or a copper alloy) at a second side thereof that is opposite the first side. One or more features (e.g., one or more openings, slots, grooves, blind vias, through vias, slot vias, etc.) may be formed in or on one or more components of the workpiece 102 by removing material therefrom (e.g., as during a cutting process, a drilling process, an engraving process, a routing process, or the like or any combination thereof) due to ablation of the material. As used herein, the term "feature region" refers to a region of a workpiece 102 that is to be processed to form a feature.

Generally, and unless explicitly stated otherwise, the term "ablation" can refer to "direct ablation," "indirect ablation" or any combination thereof. Direct ablation of a material in the workpiece 102 occurs when the dominant cause of ablation is decomposition of the material due to absorption (e.g., lincar absorption, nonlinear absorption, or any combination thereof) of energy within the beam of delivered laser energy by the material. Indirect ablation (also known as "lift-off") of a material in the workpiece 102 occurs when the dominant cause of ablation is melting and vaporization due to heat generated in, and transported from, an adjacent material which absorbs the energy within the beam of delivered laser energy.

In one embodiment, the feature may be formed to extend, completely or partially, through one or more components of the workpiece 102 (e.g., one or more electrical conductor structures, one or more dielectric structures, or the like or any combination thereof). In one embodiment, the electrical conductor structure or dielectric structure can have a thickness in a range from 5 μm to 500 μm. It will be appreciated, however, that an electrical conductor structure or a dielectric structure can have a thickness smaller than 5 μm or larger than 500 μm. Thus, a thickness of an electrical conductor structure or dielectric structure can be greater than or equal to 1 μm, 3 μm, 5 μm, 10 μm, 15 μm, 18 μm, 20 μm, 25 μm, 30 μm, 35 μm, 40 μm, 50 μm, 70 μm, 80 μm, 100 μm, 110 μm, 120 μm, 250 μm, 300 μm, 350 μm, 400 μm, 450 μm, 550 μm, 600 μm, etc., or between any of these values. Likewise, the thickness can be less than 550 μm, 450 μm, 400 μm, 350 μm, 300 μm, 250 μm, 120 μm, 110 μm, 100 μm, 80 μm, 70 μm, 50 μm, 40 μm, 35 μm, 25 μm, 20 μm, 18 μm, 15 μm, 10 μm, 5 μm, 3 μm, 1 μm, 0.5 μm, 0.1 μm, etc., or between any of these values.

Generally, feature formation may be performed by scanning a process spot along a process trajectory that defines one or more scan patterns (e.g., by controlling the first positioner 106 to scan a process spot according to one or more corresponding scan patterns within the first scanning range). Depending upon one or more factors such as the desired depth of the feature to be formed, the material(s) to be removed during feature formation, one or more parameters of the beam of laser pulses to be delivered during feature formation, or the like or any combination thereof, the feature may be formed by scanning a process spot along a scan pattern (also referred to as a "feature-forming" scan pattern) only once, or multiple times. When a process spot is scanned along a scan pattern multiple times, scanned along a scan pattern multiple times, the process spot can be repeatedly scanned along the same scan pattern (i.e., the same scan pattern can be repeatedly used). In another embodiment, at least two different scan patterns can be used during feature formation. In the event that the same scan pattern is repeatedly used, a subsequently-used scan pattern can have the same orientation (e.g., measured relative to the feature axis) as, or a different orientation from, the orientation of a previously-used scan pattern.

i. Considerations Regarding High Repetition Rate Laser Sources

As mentioned above, the first positioner 106 has a first positioning bandwidth in a range from 8 kHz to 250 MHz. When provided as one or more AOD systems, the first positioner 106 can have a positioning bandwidth that is greater than, equal to or less than 50 kHz, 75 kHz, 80 kHz, 100 kHz, 250 kHz, 500 kHz, 750 kHz, 1 MHz, 5 MHz, 10 MHz, 20 MHz, 40 MHz, 50 MHz, 75 MHz, 100 MHz, 125 MHz, 150 MHz, 175 MHz, 200 MHz, 225 MHz, 250 MHz, etc., or between any of these values. The relatively large positioning rates of AOD systems (e.g., as compared to galvanometer mirror systems) allow for the effective utilization of laser sources 104 capable of outputting laser pulses at high pulse repetition rates (e.g., at pulse repetition rates greater than or equal to 150 kHz, 175 kHz, 225 kHz, 250 kHz, 275 kHz, 500 kHz, 800 kHz, 900 kHz, 1 MHz, 1.5 MHz, 1.8 MHz, 1.9 MHz, 2 MHz, 2.5 MHz, 3 MHz, 4 MHz, 5 MHz, 10 MHz, 20 MHz, 50 MHz, 60 MHz, 100 MHz, 150 MHz, 200 MHz, 250 MHz, 300 MHz, 350 MHz, 500 MHz, 550 MHz, 600 MHz, 900 MHz, 2 GHz, 10 GHz, etc., or between any of these values.). Such high repetition rate laser sources are generally ill-suited for processing a workpiece 102 using only galvanometer mirror systems to impart movement of the beam axis 118 because of the relatively low positioning rates associated with known galvanometer mirror systems. The maximum useable positioning rate of the apparatus 100 is thus determined by the smaller of either the first positioning bandwidth or the pulse repetition rate of the laser source 104.

In working with high repetition rate laser sources, the pulse energy of an individual laser pulse is generally lower than that of an individual laser pulse output by a laser source having the same (or about the same) average power but at a lower pulse repetition rate. It has been determined that generating laser pulses having a relatively low pulse energy, but at a relatively high pulse repetition rate, can be advantageous for many laser-processing applications because the optimum fluence for peak ablation efficiency (where "ablation efficiency" can be defined in terms of unit volume of material removed per unit time per unit power, i.e., $mm^3/s/W$) is often well below the fluence used to optimize the throughput and quality for the same laser-processing applications using laser sources having relatively low repetition pulse rates. The applicant has determined that delivery of laser pulses having relatively low pulse energies at relatively high pulse repetition rates allows for development of processes at near-optimum fluences with standard beam waist dimensions for many materials, thus increasing the efficiency with which a workpiece 102 can be processed. For example, the applicant has directly observed that blind vias can be drilled in workpieces such as PCBs, FPCs, etc., at a higher throughput using high pulse repetition rate laser sources (e.g., generating relatively low pulse energy laser pulses having pulse durations in a range from 10 ns to 80 ns) as compared to the throughput achieved when using relatively low pulse repetition rate laser sources (e.g., generating relatively high pulse energy laser pulses having pulse durations in the same range from 10 ns to 80 ns) at the same (or about the same) average power. Further, the applicant has observed increased blind via drilling throughput at a pulse repetition rate of 300 kHz as compared to a pulse repetition rate of 200 kHz, even though the average power at 200 kHz was more than 50% greater than the average power at 300 KHz.

ii. Example Embodiments of Scan Patterns

Figure 16:
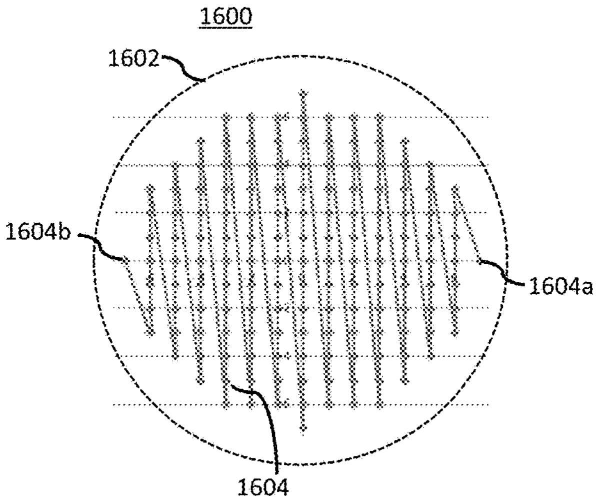
FIGS. 16-19 schematically illustrate examples of scan patterns for forming features.
Figure 17:
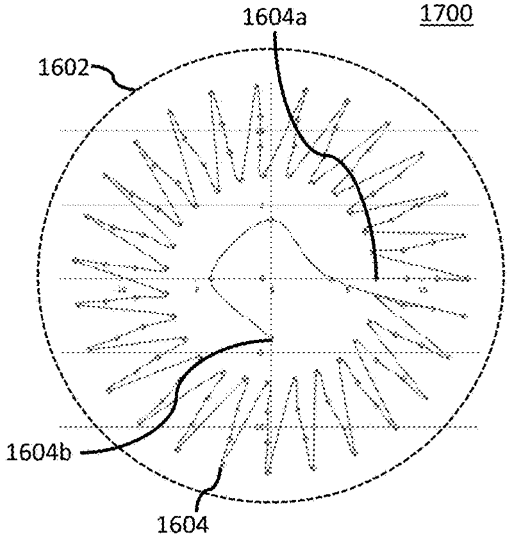
Figure 18:
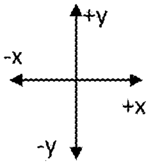
Figure 18:
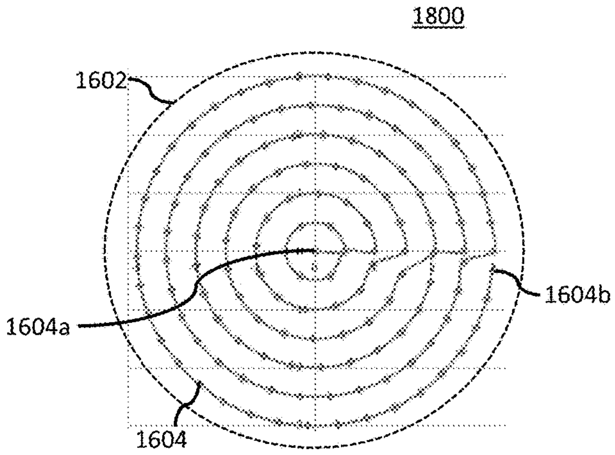
Figure 19:
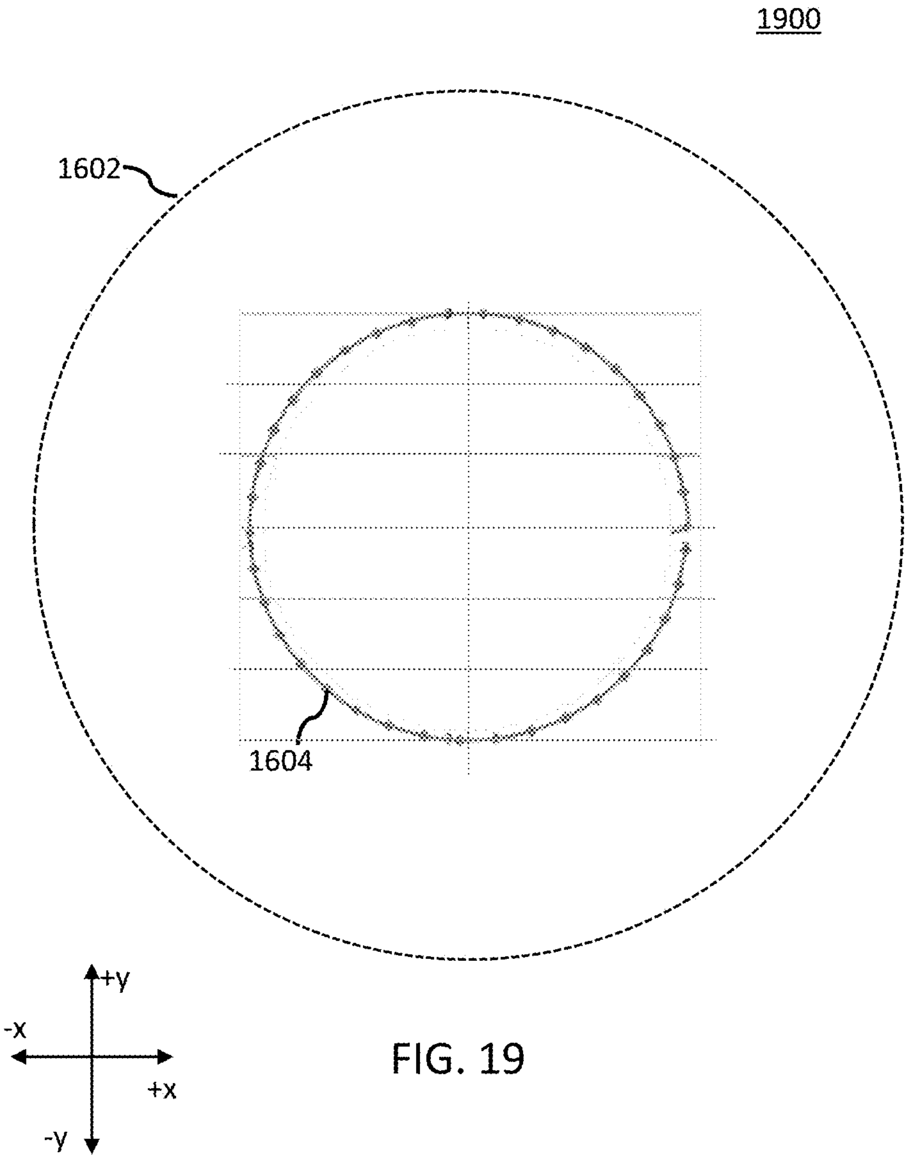

Examples of scan patterns for forming features such as vias or other holes, openings, recesses, trenches, etc., include scan patterns 1600, 1700, 1800 and 1900, shown in FIGS. 16, 17, 18 and 19, respectively, or the like or any combination thereof. Generally, the scan pattern may resemble or otherwise delineate a raster pattern (e.g., as illustrated in FIG. 16), a star polygon or a star-shaped polygon (e.g., as illustrated in FIG. 17), a spiral or a set of arcs or circles (concentrically arranged or otherwise, e.g., as illustrated in FIG. 18), a circle (e.g., as illustrated in FIG. 19), a set of circles, or one or more shapes (e.g., ellipses, triangles, squares, rectangles, or other regular or irregular shapes, etc.), or the like or any combination thereof. In one embodiment, one or more scan patterns (e.g., one or more scan patterns 1600, 1700, 1800 or 1900, or any combination thereof) may be used to remove material (e.g., by direct ablation, indirect ablation, or any combination thereof) from one or more electrical conductor structures, one or more dielectric structures, or the like or any combination thereof, during formation of a feature such as a circular opening, a via, etc.

In FIGS. 16 to 19, the dashed line 1602 represents the desired boundary, at the worksurface 102*a*, for a feature (e.g., a circular opening or via, in the present example) to be formed an electrical conductor structure or dielectric structure of the workpiece 102. For purposes of discussion with the present example, once formed in the workpiece 102, the feature can be characterized as including a "top portion" formed at the worksurface 102*a* and extending along an axis into the workpiece 102 (e.g., to either terminate within the workpiece 102, or extend completely through the workpiece 102). The portion of the feature thus terminating within the workpiece 102 or present at the other side of the workpiece 102 may herein be referred to as a "bottom portion" of the feature.

Although FIGS. 25 to 28 illustrate the boundary 1602 of the feature to be formed (also referred to herein as a "feature boundary") as being circular, it will be appreciated that the boundary may have any suitable or desired shape (e.g., elliptical, square, rectangular, triangular, hexagonal, irregular, or the like or any combination thereof. In the embodiments discussed herein, the shape of the boundary 1602 at the top and bottom portions of the feature is the same or similar (e.g., circular). In other embodiments (e.g., in which removal of a material occurs by direct ablation, and multiple scan patterns are scanned during processing of the material), the boundary 1602 at the top portion of the feature may be different from the shape of the boundary 1602 at the bottom portion of the feature. For example, the top portion of the feature may have a boundary 1602 that is circular while the top portion of the feature may have a boundary 1602 that is elliptical, rectangular, etc.).

The centers of locations for process spots within a scan pattern (each generically referred to as a "spot location" or, collectively, "spot locations") are indicated by diamonds 1604. Although scan patterns 1600, 1700, 1800 and 1900 are illustrated as having the particular arrangement of spot locations 1604 shown, it will be appreciated that any scan pattern may include more or fewer spot locations, in any suitable or desired arrangement. The arrangement of spot locations 1604 (i.e., which can be characterized by the number of spot locations, the positions of the spot locations, the pitch between adjacent spot locations, or the like or any combination thereof), within a scan pattern or disposed along a common scan line, can vary depending upon factors such as the thermal conductivity, thermal diffusivity, specific heat capacity, optical absorptivity, etc., of material at or near the spot location, the viscosity of material at or near the spot location during the formation of the feature, the optical absorptivity (relative to the beam of delivered laser energy) of material at or near the spot location, the presence or absence of any electrical conductor or dielectric structures near the spot location, the geometrical configuration of any electrical conductor or dielectric structures near the spot location, the spot size, type and shape of spatial intensity profile, pulse duration, fluence, pulse repetition rate, scan rate, the size and shape of the feature to be formed, or the like or any combination thereof. Generally, the arrangement of spot locations commonly disposed along one scan line of a particular scan pattern can be the same as, or different from, the arrangement of spot locations commonly disposed along another scan line of the particular scan pattern.

Among the spot locations 1604, spot location 1604*a* represents the first spot location in the scan pattern to be irradiated with a laser pulse and spot location 1604*b* represents the last spot in the scan pattern to be irradiated with a laser pulse. Accordingly, the solid line connecting the spot locations 1604 indicates the sequence in which the spot locations 1604 are addressed (e.g., by one or more delivered laser pulses). It should be recognized, however, that spot locations 1604 within a scan pattern may be addressed in any other desired sequence (thus changing the configuration of the solid line), and may even be addressed randomly. At any time during processing, a spot location 2540 in a scan pattern can be characterized as a previously-addressed spot location (i.e., a spot location to which laser pulses were delivered), a currently-addressed spot location (i.e., a spot location to which laser pulses are being delivered) and a to-be-addressed spot location (i.e., a spot location to which laser pulses will be delivered).

In one embodiment, the arrangement of spot locations 1604 and the sequence with which spot locations 1604 are addressed is, optionally, selected to reduce or avoid undesirable accumulation of heat (e.g., which can result in undesirable cracking, melting, vaporization, ablation, crystallization, annealing, carbonization, oxidation, etc.) within the workpiece 102 during feature formation. In another embodiment (and as described in greater detail below), the arrangement of spot locations 1604 and the sequence with which spot locations 1604 are addressed is, optionally, selected to affect (e.g., reduce) the taper of a feature that is ultimately formed. In another embodiment, the arrangement of spot locations 1604 and the sequence with which spot locations 1604 are addressed is, optionally, selected to promote heating of the workpiece 102 in a manner that facilitates efficient formation of one or more features on or within the workpiece 102.

Depending upon one or more factors such as pulse repetition rate, the first positioning bandwidth, the scan pattern to be scanned, etc., at least two temporally-sequential laser pulses (e.g., 2 laser pulses, 3, laser pulses, 5 laser pulses, 8 laser pulses, 10 laser pulses, 20 laser pulses, etc.) may be delivered to the same spot location 1604, or to different spot locations 1604. In this case, the pulse repetition rate can be generally characterized as being greater than the first positioning bandwidth. In another embodiment, however, the pulse repetition rate can be less than or equal to the first positioning bandwidth.

The period of time during which temporally-sequential laser pulses are delivered to the same spot location 1604 (or otherwise delivered within a local vicinity of a common spot location 1604) is herein referred to as a "dwell time" associated with that spot location 1604. For purposes of discussion, a laser pulse is considered to be delivered to a local vicinity of a spot location 1604 if it is delivered to within 1 μm of the spot location 1604. In one embodiment, a laser pulse is considered to be delivered to a local vicinity of a spot location 1604 if it is delivered to within 10.0 μm, 8.0 μm, 7.0 μm, 6.0 μm, 5.0 μm, 4.0 μm, 3.5 μm, 3.0 μm, 2.5 μm, 2.0 μm, 1.5 μm, 1.0 μm, 0.9 μm, 0.8 μm, 0.75 μm, 0.7 μm, 0.65 μm, 0.6 μm, 0.5 μm, 0.4 μm, 0.3 μm, 0.25 μm, 0.2 μm, 0.15 μm, 0.1 μm, 0.08 μm, 0.05 μm, 0.01 μm, or less than 0.01 μm, of the spot location 1604.

In the illustrated embodiments, a scan pattern can be characterized as including one or more series of sequentially-addressed spot locations 1604. Each such series of spot locations 1604 can generally be characterized as being disposed along a common scan line. Generally, sequentially-addressed spot locations disposed on a common scan line are closer to one another than sequentially-addressed spot locations disposed on different scan lines. A scan line may be straight (e.g., as illustrated in FIG. 16 or 17), curved (e.g., as illustrated in FIG. 18 or 19), or the like or any combination thereof. For example, the scan pattern 1600 shown in FIG. 16 includes a plurality of straight, parallel scan lines whereas the scan pattern 1700 shown in FIG. 17 includes a plurality of straight scan lines that are oblique relative to one another. The scan lines in scan pattern 1700 extend along axes which, in turn, extend radially (or generally radially) from a center of the feature boundary 1602 (or from a central region encompassing the center of the feature boundary 1602) toward the feature boundary 1602. The scan pattern 1800 shown in FIG. 18 includes a plurality of concentrically-arranged arcuate scan lines (the radially-outermost one of which extends along the desired feature boundary 1602). In FIG. 18, the spot locations 1604 are illustrated as being uniformly distributed circumferentially about the center of the circular feature boundary 1602. In another embodiment, the spot locations 1604 may be distributed in an arrangement resembling a Fibonacci sequence aligned to the center of the circular feature boundary 1602. Irradiating the workpiece at spot locations 1604 resembling a Fibonacci sequence can help to enhance the uniformity of applied laser energy distributed to the scan pattern. It will be appreciated, however, that any other suitable or desirable arrangement of spot locations 1604 can be provided. For example, different ones of the concentric rings of spot locations 1604 shown in FIG. 18 can be circumferentially offset from one another to enhance or otherwise adjust the distribution of laser energy applied to the workpiece as the scan pattern is scanned. The scan pattern 1900 shown in FIG. 19 includes a single arcuate scan line (e.g., extending along the desired feature boundary 1602).

At least one laser pulse is delivered to each spot location 1604. In one embodiment, multiple laser pulses are delivered to one or more spot locations 1604 (or otherwise delivered within a local vicinity of a common spot location 1604). Generally, the same number of laser pulses are delivered to at least two spot locations 1604 of a scan pattern, or different numbers of laser pulses can be delivered to at least two spot locations 1604 of a scan pattern.

Generally, the pitch between adjacent spot locations 1604 is considered to be greater than the distance encompassed within the local vicinity of a spot location 1604. In one embodiment, a pitch between adjacent spot locations within a scan pattern can be in a range from 0.1 μm to 50 μm. Likewise, a pitch between adjacent spot locations 1604 disposed along a common scan line may be in a range from 0.1 μm to 50 μm. Thus, a pitch between adjacent spot locations 1604 (either within the scan pattern, generally, or disposed along a common scan line) may be greater than or equal to 0.1 μm, 0.2 μm, 0.3 μm, 0.4 pm, 0.5 μm, 1 μm, 1.5 μm, 2 μm, 3 μm, 3.5 μm, 4.5 μm, 5 μm, 10 μm, 15 μm, 20 μm, 30 μm, 40 μm, 55 μm, 60 μm, 80 μm, etc., or between any of these values, or less than 50 μm, 40 μm, 30 μm, 20

μm, 15 μm, 10 μm, 5 μm, 4.5 μm, 3.5 μm, 3 μm, 2 μm, 1.5 μm, 1 μm, 0.5 μm, 0.4 μm, 0.3 μm, 0.2 μm, 0.1 μm, 0.08 μm, 0.05 μm, 0.01 μm, etc., or between any of these values. For purposes of discussion herein, the pitch between spot locations is measured as the distance between the centers of two adjacent spot locations. Two spot locations are considered to be adjacent to one another if no intervening spot location exists therebetween.

Among pairs of adjacent spot locations 1604 (either within the scan pattern, generally, or disposed along a common scan line), the pitch therebetween can be constant, variable, or any combination thereof. In one embodiment, the pitch between adjacent spot locations disposed along a common scan line can increase or decrease in a direction extending from a spot location where one laser pulse is delivered and another spot location where a laser pulse is subsequently delivered. Thus, the pitch between adjacent spot locations disposed along a common scan line can be constant, can increase, or can decrease, or any combination thereof, while moving along the scan line. Generally, the spot size of the delivered laser pulses, and the pitch between pairs of adjacent spot locations 1604, can be selected or otherwise set such that spot areas irradiated by laser pulses delivered to the pair of adjacent spot locations 1604 overlap one another, or do not overlap one another.

In one embodiment, the arrangement of scan lines (i.e., which can be characterized by the number of scan lines, the orientation of a scan line relative to another scan line, the orientation of a scan line relative to the boundary 1602, the length of a scan line, the pitch between adjacent scan lines, etc.) within the scan pattern is not limited to the arrangements shown in FIGS. 25 to 28, and can vary depending upon one or more factors such as those described above with respect to the arrangement of spot locations 1604. Thus, a scan pattern can have an odd number of scan lines or an even number of scan lines. In one embodiment, the number of scan lines in a scan pattern can be in a range from 1 to 64. For example, the number of scan lines in a scan pattern be greater than or equal to 2, 4, 8, 16, 32, 50, 60, etc., or less than 64, 32, 16, 8, 4, 2. It should also be recognized that scan pattern can have more than 64 scan lines. Within a scan pattern, at least some of the scan lines can be arranged symmetrically (or at least substantially symmetrically) or be arranged asymmetrically. Examples of symmetrical arrangements include rotationally symmetrical arrangements (i.e., n-fold rotational symmetry, where n is any integer greater than 1, such as 2, 3, 4, 5, 6, 7, 8, 9, 10, 12, 15, 20, 50, etc.) and reflective symmetrical arrangements.

VI. Embodiments Concerning Modulation of Beam Characteristics

As mentioned above, a beam of laser energy (whether continuous or pulsed) delivered to the workpiece 102 during processing of the workpiece 102 can characterized by one or more characteristics such as wavelength, average power, spatial intensity profile type, M2 factor, spatial intensity profile shape, spot size, optical intensity, fluence, etc. When the beam of laser energy includes a one or more laser pulses, the beam can also be characterized by one or more characteristics such as pulse repetition rate, pulse duration, pulse energy, peak power, etc. All of these characteristics of the beam of laser energy (whether continuous or pulsed) are herein generically and collectively referred to as "characteristics" of the beam of laser energy, or simply "beam characteristics." These and other beam characteristics may also be changed in any other suitable or desired manner that is either known in the art or otherwise disclosed herein (in this section or elsewhere). It should be noted that configuration of the delivered beam of laser energy (e.g., in terms of the identification and selection of particular combinations of beam characteristics) in a manner that provides optimum or acceptable workpiece processing requires a comprehensive understanding of fundamental laser-material interactions for the material(s) forming the workpiece 102, and the laser process to be performed. With this knowledge, and an appropriate laser source, a laser-processing technique can be developed to optimize process throughput and/or quality.

For example, the spot size may be adjusted by controlling an operation of the lens actuator, the scan lens 112 (when provided as a variable-focal length lens), the beam size adjustment mechanism, or the like or any combination thereof.

In another example, the $M^2$ factor and spatial intensity profile shape may be adjusted by operating one or more AOD systems (e.g., whether provided as the first positioner 106, or otherwise) in the manner described above. Further, techniques discussed above with respect to operating an AOD system to change the $M^2$ factor can be modified to adjust the spatial intensity profile type of a beam of laser pulses, in the manner discussed above. For example, the spectrum of an RF signal to be applied to one or more transducers of an AOD system (e.g., whether provided as the first positioner 106, or otherwise) can be shaped to have a non-Gaussian spectral profile (e.g., a rectangular or "top-hat" spectral profile). When such an RF signal is applied to one or more transducers of an AOD system (e.g., whether provided as the first positioner 106, or otherwise), a laser pulse exiting the AOD system can be changed in a manner that results in the generation of a laser pulse having a corresponding non-Gaussian spatial intensity profile type (e.g., a rectangular or "top-hat" spatial intensity profile). In one embodiment, the spectrally-shaped RF signal is not chirped. In another embodiment, the spectrally-shaped RF signal may be chirped. Thus, depending upon the manner in which an AOD system is driven (i.e., responsive to one or more applied RF signals), a laser pulse exiting the AOD system can be different from an incident laser pulse in terms of one or more characteristics such as $M^2$ factor, spatial intensity profile type, spatial intensity profile shape and spot size.

In another example, the pulse duration, pulse repetition rate, or any combination thereof, can be adjusted by changing the operation of the laser source 104. In this example, the laser source 104 can be provided as any suitable pulsed laser source capable of generating and outputting laser pulses having variable pulse durations and/or at variable pulse repetition rates (e.g., the aforementioned PYROFLEX and QUASAR lasers are known in the art to possess such capabilities). In the event that the laser source 104 includes a QCW or CW laser source, the laser source 104 may further include a pulse gating unit (e.g., an acousto-optic (AO) modulator (AOM), a beam chopper, etc.) to temporally modulate beam of laser radiation output from the QCW or CW laser source. In an embodiment in which the first positioner 106 includes an AOD system, the AOD system may be operated in any suitable or known manner to function as a pulse gating unit.

In another example, pulse energy can be adjusted by changing the operation of the laser source 104, by controlling an operation of the VOA, or the like or any combination thereof. In an embodiment in which the first positioner 106 includes an AOD system, the AOD system may be operated in any suitable or known manner to change the degree to which the beam of laser energy transmitted through the AO cell is attenuated.

Beam characteristics of laser pulses delivered to a common spot location (or delivered to within the vicinity of a common spot location) may be the same or different. For example, one or more characteristics such as spot size, pulse energy, pulse duration, pulse repetition rate, etc., of a first laser pulse delivered to a particular spot location or within the vicinity thereof (or a first set of laser pulses sequentially delivered to a particular spot location to within the vicinity thereof) may be the same as, or different from, the corresponding characteristic(s) of a second laser pulse delivered to the particular spot location or within the vicinity thereof (or of a second set of laser pulses sequentially delivered to the particular spot location to within the vicinity thereof). Likewise, beam characteristics of sequentially-delivered laser pulses delivered to different spot locations of a common scan pattern may be the same or different. Thus, one or more (or all) beam characteristics of a beam of laser energy delivered to the workpiece 102 may be kept constant (or at least substantially constant), may be modulated (e.g., so as to be substantially non-constant), or any combination thereof, during processing of the workpiece 102. Example embodiments in which one or more beam characteristics are modulated during processing of a feature are described below.

i. Feature Formation in Multilayered Workpieces

Workpieces having a multilayered construction can be processed to form one or more features that extend through multiple layers of the workpiece. In one embodiment, a multilayered workpiece 102 may be processed to form a feature such as an opening, slot, via or other hole, groove, trench, scribe line, kerf, recessed region, etc., which extends at least partially through two different layers of the multilayered workpiece 102. The different layers of the multilayered workpiece 102 may be formed of different materials, have different optical absorption characteristics (e.g., relative to the delivered beam of laser energy), or the like or any combination thereof. Accordingly, a feature may be formed in the multilayered workpiece 102 by ablating a first layer of the workpiece 102 using a beam of delivered laser energy characterized by a first set of beam characteristics to, for example, expose a second layer of the workpiece 102. Thereafter, the second layer of the workpiece 102 may be ablated using a beam of delivered laser energy characterized by a second set of beam characteristics that is different from the first set of beam characteristics (e.g., in terms of wavelength, average power, spatial intensity profile type, M2 factor, spatial intensity profile shape, spot size, optical intensity, fluence, pulse repetition rate, pulse duration, peak power, or the like or any combination thereof). Any characteristic in the second set of beam characteristics may be the same as a corresponding characteristic in the first set of beam characteristics, so long as at least one characteristics is larger than, less than, or otherwise different from a corresponding characteristic in the first set of beam characteristics.

For example, a multilayered workpiece 102 may be provided as a PCB panel, a PCB, an FPC panel, an FPC, etc., that includes a dielectric structure (e.g., a glass-reinforced epoxy laminate, a film formed of a polymer such as polyimide, polyester, PEN, PET, solder resist, etc.) adhered to a first conductor (e.g., a copper or copper alloy foil, which may have an exposed surface that is either darkened—e.g., by a chemical reaction, by a laser-darkening process, etc.—or that is not darkened) at a first side thereof and, optionally, to a second conductor (e.g., a pad, a trace, foil, etc., formed of copper or a copper alloy) at a second side thereof that is opposite the first side. The multilayered workpiece 102 may be processed to form a via extending completely through the first conductor and at least partially through the dielectric structure. The via may terminate at the second conductor (in which case the via is a blind via), or may extend completely through the second conductor (in which case the via may be a through via).

In the example given above, a beam of laser energy characterized by a first set of beam characteristics may be delivered to the first conductor (e.g., and, optionally, scanned according a scan technique exemplarily described above) in a first processing step to directly or indirectly ablate the first conductor to form an opening that exposes the dielectric structure. Thereafter, in a second processing step, a beam of laser energy characterized by a second set of beam characteristics may be delivered through the opening to the dielectric structure (e.g., and, optionally, scanned according a scan technique exemplarily described above) to directly ablate the dielectric structure form a hole extending into the dielectric structure.

In one embodiment, the first and second sets of beam characteristics may be same in terms of wavelength (e.g., the delivered beam of laser energy may have a wavelength in UV, visible or IR range of the electromagnetic spectrum), but may differ in terms of fluence, optical intensity, or the like or any combination thereof. For example, the fluence may be greater during the first processing step than during the second processing step. As between the first and second processing steps, the fluence may be adjusted by decreasing the pulse energy of the delivered beam of laser pulses, by increasing the spot size of the delivered beam of laser pulses, or the like or any combination thereof. For example, the spot size of the beam of laser pulses delivered during the second processing step (i.e., the "second spot size") can be increased relative to the spot size of the beam of laser pulses delivered during the first processing step (i.e., the "first spot size") to reduce the fluence at the process spot (e.g., below the threshold fluence at which materials from which the first and second conductors are formed can be directly ablated) without reducing average power. As a result, the number of pulses required to form the hole in the dielectric structure can be kept relatively low and damage to neighboring conductor structures can be avoided. In some embodiments, the first spot size may be in a range from 2 μm (or thereabout) to 35 μm (or thereabout) and the second spot size, while being greater than the first spot size, may be in a range of from 40 μm (or thereabout) to 150 μm (or thereabout). For example, the first spot size may be equal (or about equal) to 2 μm, 3 μm, 5 μm, 7 μm, 10 μm, 15 μm, 20 μm, 25 μm, 30 μm, 35 μm, etc., or between any of these values, and the second spot size may be equal (or about equal) to 40 μm, 50 μm, 60 μm, 80 μm, 100 μm, 125 μm, 140 μm, 155 μm, etc.

In another embodiment, the first and second sets of beam characteristics may be same in terms of wavelength (e.g., the delivered beam of laser energy may have a wavelength in UV, visible or IR range of the electromagnetic spectrum), but may differ in terms of pulse duration, pulse repetition rate, or the like or any combination thereof. For example, the pulse duration may be greater during the first processing step than during the second processing step. In this case, the pulse repetition rate may be less during the first processing step than during the second processing step. The pulse duration during the first processing step (i.e., the "first pulse duration") may be greater than 30 ns (e.g., in a range from 30 ns (or thereabout) to 200 ns (or thereabout)) and the pulse duration during the second processing step (i.e., the "second pulse duration") may be less than 40 ns (e.g., in a range from 800 ps (or thereabout) to 40 ns (or thereabout)), provided the first pulse duration is greater than the second pulse duration. The corresponding pulse repetition rate during the first processing step (i.e., the "first pulse repetition rate") may be less than or equal to 500 kHz (e.g., in a range from 150 kHz (or thereabout) to 500 kHz (or thereabout)) and the corresponding pulse repetition rate during the second processing step (i.e., the "second pulse repetition rate") may be greater than 300 kHz (e.g., in a range from 500 kHz (or thercabout) to 2 MHz (or thereabout)), provided the first pulse repetition rate is less than the second pulse repetition rate. It will be appreciated that maximum available pulse energies will depend on the specific combination of pulse duration and pulse repetition rate, but can be as high as hundreds of uJ in some combinations.

In another embodiment, the first and second sets of beam characteristics may be same in terms of wavelength (e.g., the delivered beam of laser energy may have a wavelength in UV, visible or IR range of the electromagnetic spectrum), pulse duration, pulse repetition rate, or the like or any combination thereof, but may differ in terms of pulse energy. For example, the pulse energy may be greater during the first processing step than during the second processing step. The pulse energy during the first processing step (i.e., the "first pulse energy") may be sufficiently high so as to facilitate efficient and uniform removal of the first conductor and the pulse duration during the second processing step (i.e., the "second pulse energy") may be lower than the first pulse energy, but still sufficiently high to ablate the dielectric structure. In one embodiment in which the feature to be formed is a blind via, the second pulse energy may be sufficiently low to avoid undesirably damaging the second conductor.

ii. Other Considerations for Feature Formation

Regardless of whether the workpiece 102 is multilayered, it may be desirable to modulate the pulse energy (e.g., in any manner as discussed above) such that the pulse energy of laser pulses delivered to the workpiece 102 at the beginning of scanning a scan pattern (e.g., any of the scan patterns discussed above) is higher than the pulse energy of laser pulses delivered to the workpiece 102 at the end of scanning the scan pattern.

In another embodiment, the spot size of delivered laser pulses can be modulated (e.g., in any manner as discussed above) depending upon the position of the spot location in the scan pattern. For example, with respect to the spot patterns discussed above, the spot size of delivered laser pulses can be modulated so as to be smaller at spot locations that are adjacent to the feature boundary 1604 than the spot size of laser pulses delivered to spot locations that are not adjacent to the feature boundary 1604. A smaller spot size adjacent to the feature boundary 1604 can help to produce features with sidewalls having relatively small taper while a larger spot size further away from the feature boundary 1604 can help to quickly remove material from the workpiece 102.

In another embodiment, and regardless of whether the workpiece 102 is multilayered, it may be desirable to modulate the pulse energy (e.g., in any manner as discussed above) such that the pulse energy of laser pulses delivered to the workpiece 102 at the beginning of scanning a scan pattern (e.g., any of the scan patterns discussed above) is higher than the pulse energy of laser pulses delivered to the workpiece 102 at the end of scanning the scan pattern.

In another embodiment, and regardless of whether the workpiece 102 is multilayered, it may be desirable to adjust the degree to which each laser pulse diffracted by the AOD system of the first positioner 106 is chirped (e.g., on a pulse-by-pulse basis, etc.) as a function of position of spot location irradiated, as a function of the depth within the workpiece 102 to which the laser pulse is delivered, as a function of the temperature of the material within the workpiece 102 that is being processed, as a function of the temperature of a material that is near the material within the workpiece 102 that is being processed, or the like or any combination thereof. In one embodiment, the chirp may be adjusted such that the aforementioned second conductor is polished after the first and second processing steps have been performed.

IV. Conclusion

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A laser-processing apparatus, comprising:

a laser source operative to generate a beam of laser energy, wherein the beam of laser energy is propagatable along a beam path to a workpiece;

at least one component operative to perform at least one act on the beam of laser energy selected from the group consisting of:

(a) deflecting the beam of laser energy, (b) adjusting the position of a beam waist of the beam of laser energy along the beam path, (c) adjusting a power of the beam of laser energy; and (d) adjusting a beam size of the beam of laser energy;

a beam characterization tool operative to measure one or more characteristics of the beam of laser energy from a sampling location along the beam path and generate measurement data representative of one or more of the measured beam characteristics; and at least one processor operative to:

process the measurement data to obtain one or more first measured values associated with the one or more measured characteristics of the beam of laser energy; and output one or more control signals to the at least one component when the one or more first measured values is outside a threshold processing tolerance, wherein the one or more control signals are configured to cause the at least one component to perform at least one act on the beam of laser energy such that the one or more measured characteristics of the beam of laser energy are brought to within the threshold processing tolerance.

2. The laser-processing apparatus of claim 1, wherein the one or more measured characteristics includes one or more spatial characteristics of the beam of laser energy and one or more energy characteristics of the beam of laser energy, and wherein the at least one processor is operative to:

process the measurement data to obtain the one or more measured values associated with the one or more measured spatial characteristics and the one or more measured energy characteristics of the beam of laser energy; and output one or more control signals to the at least one component when both the one or more measured values associated with the one or more measured spatial characteristics is outside a first threshold processing tolerance and the one or more measured energy characteristics is outside a second threshold processing tolerance, wherein the one or more control signals are configured to cause the at least one component to perform at least one act on the beam of laser energy such that the one or more measured energy characteristics of the beam of laser energy are brought to within the second threshold processing tolerance.

3. The laser-processing apparatus of claim 1, wherein the at least one component includes at least one positioner operative to impart relative movement between the beam path and the workpiece, wherein the one or more measured characteristics includes one or more spatial characteristics of the beam of laser energy, and wherein the at least one processor is operative to:

process the measurement data to obtain the one or more measured values associated with the one or more measured spatial characteristics of the beam of laser energy; and output one or more control signals to the at least one positioner when the one or more measured values associated with the one or more measured spatial characteristics is outside a threshold processing tolerance, wherein the one or more control signals are configured to cause the at least one positioner to modify a predetermined trajectory along which a process spot illuminated by the beam of laser energy is scanned while relative movement between the beam path and the workpiece is imparted by the at least one positioner.

4. The laser-processing apparatus of claim 1, wherein the beam characterization tool is operative to measure one or more spatial characteristics of the beam of laser energy.

5. The laser-processing apparatus of claim 1, wherein the at least one component includes is at least one selected from the group consisting of an acousto-optic deflector (AOD) system, a micro-electro-mechanical-system (MEMS) mirror system, a fast-steering mirror (FSM) element, a galvanometer mirror system and a workpiece stage.

6. The laser-processing apparatus of claim 1, wherein the at least one component includes a variable optical attenuator.

7. The laser-processing apparatus of claim 1, wherein the at least one component includes at least one selected from the group consisting of a zoom lens, variable-focus lens, a motorized variable beam expander, a deformable mirror, a variable-radius mirror, a variable-focus moiré lens, a motorized Z-axis lens, a motorized iris diaphragm and a motorized aperture wheel.

8. The laser-processing apparatus of claim 3, wherein the at least one component includes the at least one positioner.

9. The laser-processing apparatus of claim 8, wherein the at least one positioner includes at least one selected from the group consisting of an acousto-optic deflector (AOD) system, a micro-electro-mechanical-system (MEMS) mirror system, a fast-steering mirror (FSM) element, a galvanometer mirror system and a workpiece stage.

10. The laser-processing apparatus of claim 2, wherein the one or more spatial characteristics of the beam of laser energy includes at least one selected from the group consisting of spatial energy distribution, spatial phase distribution, spatial polarization distribution, spot size, spot size, spot shape, spot shape, spot orientation, spot centroid, and spot quality.

11. The laser-processing apparatus of claim 10, wherein the one or more spatial characteristics of the beam of laser energy includes spot size.

12. The laser-processing apparatus of claim 10, wherein the one or more spatial characteristics of the beam of laser energy includes spot shape.

13. The laser-processing apparatus of claim 1, wherein the beam characterization tool is arranged and configured to measure the one or more characteristics of the beam of laser energy at an end of the beam path.

14. The laser-processing apparatus of claim 1, wherein the beam characterization tool is arranged and configured to measure the one or more characteristics of the beam of laser energy at a location along the beam path.

15. The laser-processing apparatus of claim 14, further comprising a beam splitter arranged in the beam path and configured to propagate portion of the laser energy propagating along the beam path to the beam characterization tool.

16. A controller for use with a laser-processing apparatus including a laser source operative to generate a beam of laser energy, at least one component operative to perform at least one act on the beam of laser energy selected from the group consisting of: (a) deflecting the beam of laser energy, (b) adjusting the position of a beam waist of the beam of laser energy in a beam path along which the beam of laser energy is propagatable to a workpiece, (c) adjusting a power of the beam of laser energy; and (d) adjusting a beam size of the beam of laser energy, and a beam characterization tool operative to measure one or more characteristics of the beam of laser energy from a sampling location along the beam path and generate measurement data representative of one or more of the measured beam characteristics, the controller comprising:

at least one processor operative to:

process the measurement data to obtain one or more measured values associated with the one or more measured characteristics of the beam of laser energy; and output one or more control signals to the at least one component when the one or more measured values is outside a threshold processing tolerance, wherein the one or more control signals are configured to cause the at least one component to perform at least one act on the beam of laser energy such that the one or more measured characteristics of the beam of laser energy are brought to within the threshold processing tolerance.

17. A non-transitory computer-readable media for use with a laser-processing apparatus including a laser source operative to generate a beam of laser energy, at least one component operative to perform at least one act on the beam of laser energy selected from the group consisting of: (a) deflecting the beam of laser energy, (b) adjusting the position of a beam waist of the beam of laser energy in a beam path along which the beam of laser energy is propagatable to a workpiece, (c) adjusting a power of the beam of laser energy; and (d) adjusting a beam size of the beam of laser energy, a beam characterization tool operative to measure one or more characteristics of the beam of laser energy from a sampling location along the beam path and generate measurement data representative of one or more of the measured beam characteristics, and a controller operative to control an operation of the at least one component, the non-transitory computer-readable media having instructions stored thereon which, when executed by the controller, cause the controller to:

process the measurement data to obtain one or more measured values associated with the one or more measured characteristics of the beam of laser energy; and output one or more control signals to the at least one component when the one or more measured values is outside a threshold processing tolerance, wherein the one or more control signals are configured to cause the at least one component to perform at least one act on the beam of laser energy such that the one or more measured characteristics of the beam of laser energy are brought to within the threshold processing tolerance.

* * * * *